(12) United States Patent
Laumeyer et al.

(10) Patent No.: US 6,363,161 B2
(45) Date of Patent: Mar. 26, 2002

(54) SYSTEM FOR AUTOMATICALLY GENERATING DATABASE OF OBJECTS OF INTEREST BY ANALYSIS OF IMAGES RECORDED BY MOVING VEHICLE

(75) Inventors: Robert Anthony Laumeyer, Minneapolis; James Eugene Retterath, Excelsior, both of MN (US)

(73) Assignee: Facet Technology Corp., Excelsior, MN (US)

( * ) Notice: Subject to any disclaimer, the term of this patent is extended or adjusted under 35 U.S.C. 154(b) by 0 days.

(21) Appl. No.: 09/883,816

(22) Filed: Jun. 18, 2001

Related U.S. Application Data

(63) Continuation of application No. 09/177,836, filed on Oct. 23, 1998, now Pat. No. 6,266,442.

(51) Int. Cl.[7] ................................. G06K 9/00
(52) U.S. Cl. ........................... 382/104; 382/156
(58) Field of Search ................. 382/103, 104, 382/105, 106, 156, 157, 164, 190, 195; 358/453, 456, 462; 701/117

(56) References Cited

U.S. PATENT DOCUMENTS

| | | |
|---|---|---|
| 5,392,365 A | 2/1995 | Steinkirchner |
| 5,448,484 A | 9/1995 | Bullock et al. |
| 5,465,115 A | 11/1995 | Conrad et al. |
| 5,465,308 A | 11/1995 | Hutcheson et al. |
| 5,627,915 A | 5/1997 | Rosser et al. |
| 5,633,944 A | 5/1997 | Guibert et al. |
| 5,633,946 A | 5/1997 | Lachinski et al. |
| 5,699,444 A | 12/1997 | Palm |
| 5,740,274 A | 4/1998 | Ono et al. |
| 5,790,691 A | 8/1998 | Narayanswamy et al. |
| 5,844,699 A | 12/1998 | Usami et al. |
| 5,864,630 A | 1/1999 | Cosatto et al. |
| 5,974,521 A | 10/1999 | Akerib |
| 5,991,085 A | 11/1999 | Rallison |
| 6,064,768 A | 5/2000 | Hajj et al. |
| 6,141,433 A | 10/2000 | Moed et al. |

OTHER PUBLICATIONS

*Landmark Recognition using Projection Learning for Mobile Robot Navigation*, Ren C. Luo, Harsh Potlapalli, Center for Robotics and Intelligent Machines, IEEE World Congress on Computational Intelligence, vol. IV, pp. 2703–2708, Jun. 1994.

(List continued on next page.)

Primary Examiner—Andrew W. Johns
Assistant Examiner—Seyed Azarian
(74) Attorney, Agent, or Firm—Patterson, Thuente, Skaar & Christensen, P.A.

(57) ABSTRACT

A system for automatically generating a database of images and positions of objects of interest identified from video images depicting roadside scenes that are recorded from a vehicle navigating a road and having a system that stores location metrics for the video images.

76 Claims, 8 Drawing Sheets

OTHER PUBLICATIONS

*A Real–Time Traffic Sign Recognition System*, S. Estable, J. Schick, F. Stein, R. Janssen, R. Ott, W. Ritter, Y.–J. Zheng, Daimler–Benz Research Center, Proceedings of the Intelligent Vehicles '94 Symposium, Paris, France, pp. 213–218, Oct. 1994.

*Recognition of Traffic Signs by Artificial Neural Network*, D. Ghica, S. Lu, X. Yuan, Dept. of Computer Science Memorial University of Newfoundland, IEEE, pp. 1444–1449, Mar. 1995.

*Realtime Traffic Sign Recognition (TSR)*, Jens Logemann, Ed., Univeritat Koblenz—Landau, 3 pgs., Nov. 1997.

*Registering Multiple Cartographic Models with the Hierarchical Mixture of Experts Algorithm*, Simon Moss and Edwin R. Hancock, Dept. of Computer Science, University of New York, IEEE, pp. 909–914, 1997.

*Multi–Modal Tracking of Faces for Video Communications*, James L. Crowley and Francois Berard, GRAVIR—IMAG, I.N.P. Grenoble, Grenoble, France, IEEE, pp. 640–645, 1997.

*Road Traffic Sign Detection and Classification*, A. Escalera, L. Moreno, M. Salichs, J. Armingol, IEEE Transactions on Industrial Electronics, vol. 44, No. 6, pp. 848–859, Dec. 1997.

*Dominant Color Transform and Circular Pattern Vector for Traffic Sign Detection and Recognition*, Jung Hak and Tae Young Choi, IEICE Transaction Fundamentals, vol. E81–A, No. 6, pp. 1128–1135, Jun. 1998.

*A Trainable Pedestrian Detection System*, C. Papageorgiou, T. Evgenious, T. Poggio, Center for Biological And Computational Learning and Artificial Intelligence Laboratory, MIT, IEEE International Conference on Intelligent Vehicles, pp. 241–246, 1998.

*Robust Lane Recognition Embedded in a Real–Time Driver Assistance System*, R. Risack, P. Klausmann, W. Krüger, W. Enkelmann, Fraunhofer–Institut für Informations, Karlsruhe, Germany, IEEE International Conference on Intelligent Vehicles, pp. 35–40, 1998.

*A Texture–based Object Detection and an Adaptive Model–based Classification*, T. Kalinke, C. Tzomakas, W. Seelen, Institut für Neuroinformatik, Bochum, Germany, IEEE International Conference on Intelligent Vehicles, pp. 143–148, 1998.

Internet Printout: *The Road Sign Recognition System—$RS^2$*, Faculty of Transportation Sciences, Prague, Czech Republic, 7 pgs., c. approximately 1999.

Internet Printout: *The Chamfer System*, 4 pgs., c. approximately 1999.

*Real–Time Object Recognition: Hierarchical Image Matching in a Parallel Virtual Machine Environment*, J. You, P. Bhattacharya, S. Hungenahally, School of Computing and Information Technology, Griffith University, Brisbane, Australia, Dept. of Computer Engineering, University of Nebraska, Lincoln, Nebraska, 3 pgs., undated.

*An Architecture of Object Recognition System for Various Images Based on Multi–Agent*, Keiji Yanai, Koichiro Deguchi, Dept. of Computer Science, University of Electro–Communications, Tokyo, Japan, and Dept. of Mathematical Engineering and Information Physics, University of Tokyo, Tokyo, Japan, 4 pgs., undated.

*Multi–Feature Matching Algorithm for Free–Form 3D Surface Registration*, C. Schütz, T. Jost, H, Hügli, Institute for Microtechnology, Neuchatel, Switzerland, 3 pgs., undated.

*Representation of Uncertainty in Spatial Target Tracking*, Tim Baker, Malcolm Strens, DERA Farnborough, United Kingdom, 4 pgs., undated.

*Using Centroid Covariance in Target Recognition*, Gang Liu and Robert M. Haralick, Dept. of Electrical Engineering, University of Washington, Seattle, Washington, 4 pgs., undated.

*Using Spatial Sorting and Ranking in Model Based Object Recognition*, G. Hjaltason, M. Ray, H. Samet, I. Weiss, Computer Science Dept. University of Maryland, College Park, Maryland, 3 pgs., undated.

*Surveillance Systems for Terrestrial Transport Safety and Improved User Information Capability*, C. Nwagboso, C. Regazzoni, M. Renard, E. Stringa, Bolton Institute, Bolton, United Kingdom, Dept. of Biophysical & Electronic Engineering, Genova, Italy, Vigitec, Brussels, Belgium, pp. 1–7, undated.

*Illumination Invariant Image Indexing Using Moments and Wavelets*, Mandal, Journal of Electronic Imaging, vol. 7 (2), pp. 282–293, Apr. 1998.

*Feature Integration and Relevancy Feedback Analysis in Image Similarity Evaluation*, Celentano, Journal of Electronic Imaging, vol. 7 (2), pp. 308–317, Apr. 1998.

*Auto–associative Segmentation for Real–Time Object Recognition in Realistic Outdoor Images*, Leonardo Estevez and Nasser Kehtarnavaz, Dept. of Electricial Engineering, Texas A&M University, Journal of Electronic Imaging, vol. 72, pp. 378–385, Apr. 1998.

h>l h>l

SYSTEM FOR AUTOMATICALLY GENERATING DATABASE OF OBJECTS OF INTEREST BY ANALYSIS OF IMAGES RECORDED BY MOVING VEHICLE

This is a Continuation of application Ser. No. 09/177,836 filed Oct. 23, 1998, U.S. Pat. No. 6,266,442.

FIELD OF THE INVENTION

The present invention relates generally to the field of automated image analysis and identification. More specifically, the present invention relates to a system for automatically generating a database of images and positions of objects of interest identified from video images depicting roadside scenes that are recorded from a vehicle navigating a road and having a system that stores location metrics for the video images.

BACKGROUND OF THE INVENTION

The recognition of objects of interest, such as road sign images, in a set of video images has been developed primarily for use in connection with automated vehicle navigation systems. By recognizing such images from the real time output of a forward facing video camera on board a vehicle, instructions and navigational assistance can be provided to a driver or an entirely automated vehicle navigation system can be developed. Unlike object recognition systems that are deployed in a controlled environment with known lighting and background conditions, road sign recognition systems must be able to perform under a wide range of environmental and lighting conditions. In addition, the images must be recognized quickly and in real time so that the information can be immediately available for use. Fortunately, most navigational road sign images are made of regular shapes and have colors that are known and conform to certain standards and combinations. All of these factors have resulted in the use of template matching and color pair matching as the most common image analysis techniques for quickly isolating road sign images from the real time video signal.

While existing techniques that identify road sign images by using template matching can identify a limited subset of road signs that are particularly helpful in driving instruction and navigational information, the need to perform these operations in real time limits the overall number and types of road signs that can be identified by such a template matching technique. The more template patterns and color pairs that are added to a template matching technique, the longer it takes to process the video image. Consequently, many types of road signs that convey non-navigational information, such as parking information, are excluded from the template matching process in order to reduce the total possible number of combinations that must be evaluated.

U.S. Pat. No. 5,633,946 describes a method and apparatus for collecting and processing visual and spatial information from a moving platform. This patent describes a vehicle with multiple video cameras oriented in different directions that record road scenes as the vehicle is driven along a road. Positional information from a Global Positioning System (GPS) receiver and an inertial navigation system (INS) in the vehicle is simultaneously recorded with the video images. Frames of the video signal from multiple cameras are interleaved together and each frame is recorded on a video tape with a time code along with the current spatial position information provided by the GPS receiver and the INS. The video images are then analyzed with a centerline offset process to create street segments that represent a sequence of video images associated with a given segment of a street or road. The patent describes a number of applications for using the street segment information which can include the creation and update of address ranges, the integration of address attribute information, the creation and maintenance of street network topologies, the collection of vehicle routing information, the creation and maintenance of map boundary polygon topologies and attributes, and the accurate location of point features and their attributes. In each of these cases, however, the video images in a given street segment must be examined visually by an operator in order to extract relevant attribute information.

One problem that is encountered when analyzing images recorded by a moving vehicle to identify objects of interest is the massive amount of video images that must be reviewed. As described in U.S. Pat. No. 5,633,946, multiple video cameras are preferably used to capture roadside images as the moving vehicle travels along a road or street. In a preferred embodiment of this patent, video images from eight separate cameras are combined and stored on a single video tape at a combined constant rate of about 30 frames per second, or about 4 frames per second per camera. The result is a tremendous amount of video data generated by the moving vehicle that must be analyzed in order to identify potential objects of interest. This problem is only increased by the desire to add more resolution to the video images to enhance the video images. This massive amount of video data overwhelms conventional techniques for identifying objects of interest, such as road sign images, that have been used to date in connection with vehicle navigation systems. Moreover, this problem is only increased by the desire to further increase pixel resolution of the video images in order to enhance the quality of those video images. The problem is further compounded by the fact that the rate of data capture of the video images effectively dictates the speed at which the moving vehicle can travel in recording the images. The faster the vehicle goes, the more desirable it is to increase the rate of data capture, thereby exacerbating the problem of needing to evaluate massive amounts of data.

It would be desirable to provide a system for automatically generating a database of images and positions of objects of interest identified from video images depicting roadside scenes that are recorded from a vehicle navigating a road and having a system that stores location metrics for the video images.

SUMMARY OF THE INVENTION

The exemplary embodiment described, enabled, and taught herein is directed to the task of building a database of road signs by type, location, orientation, and condition by processing vast amounts of video image frame data. The image frame data depict roadside scenes as recorded from a vehicle navigating said road. By utilizing differentiable characteristics the portions of the image frame that depict a road sign are stored as highly compressed bitmapped files each linked to a discrete data structure containing one or more of the following memory fields: sign type, relative or absolute location of each sign, reference value for the recording camera, reference value for original recorded frame number for the bitmap of each recognized sign. The location data is derived from at least two depictions of a single sign using techniques of triangulation, correlation, or estimation. Thus, output signal sets resulting from application of the present method to a segment of image frames can include a compendium of data about each sign, and bitmap records of each sign as recorded by a camera. Thus, records are created for image-portions that possess (and exhibit) detectable unique differentiable characteristics versus the majority of other image-portions of a digitized image frame. In the exemplary sign-finding embodiment herein these differentiable characteristics are coined "sign-ness." Thus, based on said differentiable characteristics, or sign-ness, information regarding the type, classification, condition (linked bitmap image portion) and/or location of road signs (and image-portions depicting said road signs) are rapidly extracted from image frames. Those image frames that do not contain an appreciable level of sign-ness are immediately discarded.

Differentiable characteristics of said objects include convexity/symmetry, lack of 3D volume, number of sides, angles formed at corners of signs, luminescence of lumina values, which represent illumination tolerant response in the L*u*v* of LCH color spaces (typically following a transforming step from a first color space like RGB); relationship of edges extracted from portions of image frames, shape, texture, and/or other differentiable characteristics of one or more objects of interest versus background objects. The differentiable characteristics are preferably tuned with respect to the recording device and actual or anticipated recording conditions are taught more fully hereinbelow.

The method and apparatus of the present invention rapidly identifies, locates, and stores images of objects depicted in digitized image frames based upon one or more differentiable characteristics of the objects (e.g., versus non-objects and other detected background noise). The present invention may be implemented in a single microprocessor apparatus, within a single computer having multiple processors, among several locally-networked processors (i.e., an intranet), or via a global network of processors (i.e., the internet and similar). Portions of individual image frames exhibiting an appreciable level of pre-selected differentiable characteristics of desired objects are extracted from a sequence of video data and said portions of the individual frames (and correlating data thereto) are used to confirm that a set of several "images," in fact, represent a single "object" of a class of objects. These preselected differentiable characteristic criteria are chosen from among a wide variety of detectable characteristics including color characteristics (color-pairs and color set memberships), edge characteristics, symmetry, convexity, lack of 3D volume, number and orientation of side edges, characteristic corner angles, frequency, and texture characteristics displayed by the 2-dimensional (2D) images so that said objects can be rapidly and accurately recognized. Preferably, the differentiable characteristics are chosen with regard to anticipated camera direction relative to anticipated object orientation so that needless processing overhead is avoided in attempting to extract features and characteristics likely not present in a given image frame set from a known camera orientation. Similarly, in the event that a scanning recording device, or devices, are utilized to record objects populating a landscape, area, or other space, the extraction devices can be preferably applied only to those frames that likely will exhibit appreciable levels of an extracted feature or characteristic.

In a preferred embodiment, the inventive system taught herein is applied to image frames and unless at least one output signal from an extraction filter preselected to capture or highlight a differentiable characteristic of an object of interest exceeds a threshold value, the then-present image frame is discarded. For those image frames not discarded, an output signal set of location, type, condition, and classification of each identified sign is produced and linked to at least one bitmap image of said sign. The output signal set and bitmap record(s) are thus available for later scrutiny, evaluation, processing, and archiving. Of course, prefiltering or conditioning the image frames may increase the viability of practicing the present invention. Some examples include color calibration, color density considerations, video filtering during image capture, etc.

In a general embodiment of the present invention, differentiable characteristics present in just two (2) images of a given object are used to confirm that the images in fact represent a single object without any further information regarding the location, direction, or focal length of an image acquisition apparatus (e.g., digital camera) that recorded the initial at least two image frames. However, if the location of the digital camera or vehicle conveying said digital camera (and the actual size of the object to be found) are known, just a single (1) image of an object provides all the data required to recognize and locate the object.

The present invention has been developed to identify traffic control, warning, and informational signs, "road signs" herein, that appear adjacent to a vehicle right-of-way, are visible from said right-of-way, and are not obscured by non-signs. These road signs typically follow certain rules and regulations relative to size, shape, color (and allowed color combinations), placement relative to vehicle pathways (orthogonal), and sequencing relative to other classes of road signs. While the term "road sign" is used throughout this written description of the present invention, a person of ordinary skill in the art to which the invention is directed will certainly realize applications of the present invention to other similar types of object recognition. For example, the present invention may be used to recognize, catalogue, and organize searchable data relative to signs adjacent a railroad right-of-way, nature trail ways, recreational vehicle paths, commercial signage, utility poles, pipelines, billboards, man holes, and other objects of interest that are amenable to video capture techniques and that inherently possess differentiable characteristics relative to their local environment. Of course, the present invention may be practiced with imaging systems ranging from monochromatic visible wavelength camera/film combinations, to full color spectrum visible wavelength camera/memory combinations, to ultraviolet, near infrared, or infrared imaging systems, so long as basic criteria are present: object differentiability from its immediate milieu or range data.

Thus, the present invention transforms frames of digital video depicting roadside scenes using a set of filters that are logically combined together with OR gates or combined algorithmically and each output is equally weighted, and that each operate quickly to capture a differentiable characteristic of one or more road signs of interest. Frequency and spatial domain transformation, edge domain transformation (Hough space), color transformation typically from a 24 bit RGB color space to either a L*u*v* or LCH color space (using either fuzzy color set tuning or neural network tuning for objects displaying a differentiable color set), in addition to use of morphology (erosion/dilation), and a moment calculation applied to a previously segmented image frame is used to determine whether an area of interest that contains an object is actually a road sign. The aspect ratio and size of a potential object of interest (an "image" herein) can be used to confirm that an object is very likely a road sign. If none of the filters produces an output signal greater than a noise level signal, that particular image frame is immediately discarded. The inventors note that in their experience, if the recording device is operating in an urban setting with a recording vehicle operating at normal urban driving speeds and the recording device has a standard frame rate (e.g., thirty frames per second), only about twelve (12) frames per thousand (1.2%) have images, or portions of image frames, that potentially correlate to a single road sign of sufficiently detectable size. Typically, only four (4) frames per thousand actually contain an object of interest, or road sign in the exemplary embodiment. Thus, a practical requirement for a successful object recognition method is the ability to rapidly cull the ninety-eight percent (98%) of frames that do not assist the object recognition process. In reality, more image frames contain some visible cue as to the presence of a sign in the image frame, but the amount of differentiable data is typically recorded by the best eight (8) or so images of each potential object of interest. The image frames are typically coded to correspond to a camera number (if multiple cameras are used) and camera location data (i.e., absolute location via GPS or inertial coordinates if INS is coupled to the camera of camera-carrying vehicle). If the location data comprises a time/position database directly related to frame numbers (and camera information in a multi-camera imaging system), extremely precise location information is preferably derived using triangulation of at least two of the related "images" of a confirmed object (road sign).

The present invention successfully handles partially obscured signs, skewed signs, poorly illuminated signs, signs only partially present in an image frame, bent signs, and ignores all other information present in the stream of digital frame data (preferably even the posts that support the signs). One of skill in the art will quickly recognize that the exemplary system described herein with respect to traffic control road signs is readily adaptable to other similar identification of a large variety of man-made structures. For example, cataloging the location, direction the camera is facing, condition, orientation, and other attributes of objects such as power poles, telephone poles, roadways, railways, and even landmarks to assist navigation of vehicles can be successfully completed by implementing the inventive method described herein upon a series of images of said objects. In a general embodiment, the present invention can quickly and accurately distill arbitrary/artificial objects disposed in natural settings and, except for confirming at least one characteristic of the object (e.g., color, linear shape, aspect ratio, etc.), the invention operates successfully without benefit of pre-existing knowledge about the full shape, actual condition, or precise color of the actual object.

The present invention is best illustrated with reference to one or more preferred embodiments wherein a series of image frames (each containing a digital image of at least a portion of an object of interest) are received, at least two filters (or segmentation algorithms) applied, spectral data of the scene scrutinized so that those discrete images that exceed at least one threshold of one filter during extraction processing become the subject of more focused filtering over an area defined by the periphery of the image. The periphery area of the image is found by applying common region growing and merging techniques to grow common-color areas appearing within an object. The fuzzy logic color filter screens for the color presence and may be implemented as a neural network. In either event, an image area exhibiting a peak value representative of a color set which strongly correlates to a road sign of interest is typically maintained for further processing. If, an only if, the color segmentation routine fails, a routine to determine the strength of the color pair output is then applied to each image frame that positively indicated presence of a color pair above the threshold noise level. Then further segmentation is done possibly using color, edges, adaptive thresholding, color frequency signatures, or moment calculations. Preferably, the image is segmented into an arbitrary number of rectangular elements (e.g., 32 or 64 segments). The area where the color pair was detected is preferably grown to include adjacent image segments that also exhibit an appreciable color-pair signal in equal numbered segments. This slight expansion of a search space during the moment routine does not appreciably reduce system throughput in view of the additional confirming data derived by expanding the space. Morphology techniques are then preferably used to grow and erode the area defined by the moment routine-segmented space until either the grown representation meets or fails to meet uniform criteria during the dilation and erosion of the now segmented image portion of the potential object ("image"). If the image areas meet the morphological criteria, a final image periphery is calculated. Preferably, this final image periphery includes less than the maximum, final grown image so that potential sources of error, such as non-uniform edges, and other potentially complex pixel data are avoided and the final grown representation of the image essentially includes only the actual colored "face" of the road sign. A second order calculation can be completed using the basic segmented moment space which determines the "texture" of the imaged area—although the inventors of the present invention typically do not routinely sample for texture.

The face of the road sign can be either the colored front portion of a road sign or the typically unpainted back portion of a road sign (if not obscured by a sign mounting surface). For certain classes of road signs only the outline of the sign is all that is needed to accurately recognize the sign. One such class is the ubiquitous eight-sided stop sign. A "bounding box" is defined herein as a polygon which follows the principal axis of the object. Thus, rotation, skew or a camera or a sign, and bent signs are not difficult to identify. The principal axis is a line through the center of mass and at least one edge having a minimum distance to all pixels of the object. In this way a bounding box will follow the outline of a sign without capturing non-sign image portions.

Then, the aspect ratio of the finally grown image segment is calculated and compared against a threshold aspect ratio set (three are used herein, each corresponding to one or more classes of road signs) and if the value falls within preset limits, or meets other criteria such as percentage of color (# of pixels), moments, number of corners, corner angles, etc., the threshold image portion (road sign face) is saved in a descending ordered listing of all road signs of the same type (where the descending order corresponds to the magnitude or strength of other depictions of possible road signs). For a class of road signs where the sign only appears as a partial sign image, the inventors do not need special processing since only three intersecting edges (extracted via a Hough space transformation), grown together if necessary, in addition to color-set data is required to recognize most every variety of road sign. The aspect ratio referred to above can be one of at least three types of bounding shape: a rectangular (or polygon) shape, an ellipse-type shape, or a shape that is mathematically related to circularity-type shapes. For less than four-sided signs the rectangular polygon shapes are used, and for more than four sides the ellipse-type shapes are used.

The frame buffer is typically generated by a digital image capture device. However, the present invention may be practiced in a system directly coupled to a digital image capture apparatus that is recording live images, or a pre-recorded set of images, or a series of still images, or a digitized version of an original analog image sequence.

Thus, the present invention may be practiced in real time, near real time, or long after initial image acquisition. If the initial image acquisition is analog, it must be first digitized prior to subjecting the image frames to analysis in accordance with the invention herein described, taught, enabled, and claimed. Also, a monitor can be coupled to the processing equipment used to implement the present invention so that manual intervention and/or verification can be used to increase the accuracy of the ultimate output, a synchronized database of characteristic type(s), location(s), number(s), damaged and/or missing objects.

Thus, the present invention creates at least a single output for each instance where an object of interest was identified. Further embodiments include an output comprising one or more of the following: orientation of the road sign image, location of each identified object, type of object located, entry of object data into an Intergraph GIS database, and bitmap image(s) of each said object available for human inspection (printed and/or displayed on a monitor), and/or archived, distributed, or subjected to further automatic or manual processing.

Given the case of identifying every traffic control sign in a certain jurisdiction, the present invention is applied to scrutinize standard videostream of all roadside scenes present in said jurisdiction. Most jurisdictions authorize road signs to be painted or fabricated only with specific discrete color-pairs, and in some cases color-sets (e.g., typically having between one and four colors) for use as traffic control signage. The present invention exploits this feature in an exemplary embodiment wherein these discrete color-sets form a differentiable criteria. Furthermore, in this embodiment a neural network is rapidly and efficiently trained to recognize regions in the image frames that contain these color-sets. Examples of said color sets presently useful in recognizing road signs in the U.S. include: red/white, white/black/red, green/white/blue, among several others easily recognizable by those of skill in the art.

Of course, certain characteristic colors themselves can assist the recognition of road signs from a scene. For example, a shade of yellow depicts road hazard warnings and advisories, white signs indicate speed and permitted lane change maneuver data, red signs indicate prohibited traffic activity, etc. Furthermore, since only a single font is approved for on-sign text messages in the U.S., character recognition techniques (e.g., OCR) can be applied to ensure accurate identification of traffic control signage as the objects of interest in a videostream. Therefore, a neural network as taught herein is trained only on a few sets of image data including those visual characteristics of objects of interest such as color, reflectance, fluorescence, shape and location with respect to a vehicle right-of-way and operates to accurately identify the scenes in an economical and rapid manner. In addition, known line extracting algorithms, line completion, or "growing" routines, and readily available morphology techniques may be used to enhance the recognition processing without adding significant additional processing overhead.

In a general application of the present invention, a conclusion may be drawn regarding whether object(s) appearing in a sequence of video data are fabricated by humans or naturally generated by other than manual processing. In this class of applications the present invention can be applied to enhance the success of search and rescue missions where personnel and vehicles (or portions of vehicles) may be randomly distributed throughout a large area of "natural materials". Likewise, the method taught in the present disclosure finds application in undersea, terrestrial, and extra-terrestrial investigations wherein certain "structured" foreign (artificial or man-made) materials are present in a scene of interest might only occur very infrequently over a very large sample of videostream (or similar) data. The present invention operates as an efficient graphic-based search engine too. The task of identifying and locating specific objects in huge amounts of video data such as searching for missile silos, tanks, or other potential threats depicted in images captured from remote sensing satellites or air vehicles readily benefits from the automated image processing techniques taught, enabled, and disclosed herein.

The present invention thus finds utility over this variety of prior art methods and devices and solves a long-standing need in the art for a simple apparatus for quickly and accurately recognizing, classifying, and locating each of a variety of objects of interest appearing in a videostream. Determining that an object is the "same" object from a distinct image frame.

The present invention addresses an urgent need for virtually automatic processing of vast amounts of video data—that possibly depict one or more desired objects—and then precisely recognize, accurately locate, extract desired characteristics, and, optionally, archive bitmap images of each said recognized object. Processing such video information via computer is preferred over all other forms of data interrogation, and the inventors suggest that such processing can accurately and efficiently complete a task such as identifying and cataloguing huge numbers of objects of interest to many public works departments and utilities; namely, traffic signs, traffic lights, man holes, power poles and the like disposed in urban, suburban, residential, and commercial settings among various types of natural terrain and changing lighting conditions (i.e., the sun).

A person of skill in the art will of course recognize myriad applications of the invention taught herein beyond the repetitive object identification, fabricated materials identification, and navigation examples recited above. These and other embodiments of the present invention shall be further described herein with reference to the drawings appended hereto.

The following figures are not drawn to scale and only detail a few representative embodiments of the present invention, more embodiments and equivalents of the representative embodiments depicted herein are easily ascertainable by persons of skill in the art.

FIG. 1 depicts an embodiment of the present invention illustrated as a block diagram wherein video image frame segments feed into a set of at least two extraction filters which have outputs that are logically "OR'd", each non useful image frame is discarded and regions of useful image frames inspected, the regions satisfying sign criteria classified, saved original frame number, and, if desired a correlated sign list linked to camera, frame number, location, or orientation is produced and linked to at least one actual bitmapped image frame portion depicting the sign.

FIGS. 2A, 2B, and 2C depict a portion of a image frame wherein parts of the edges of a potential object are obscured (in ghost), or otherwise unavailable, in an image frame (2A), and the same image frame portion undergoing edge extraction and line completion (2B), and the final enhanced features of the potential object (2C).

FIGS. 7A–F depicts the general outline and shape of six relatively common road signs.

DESCRIPTION OF PREFERRED EMBODIMENT

Figure 1:
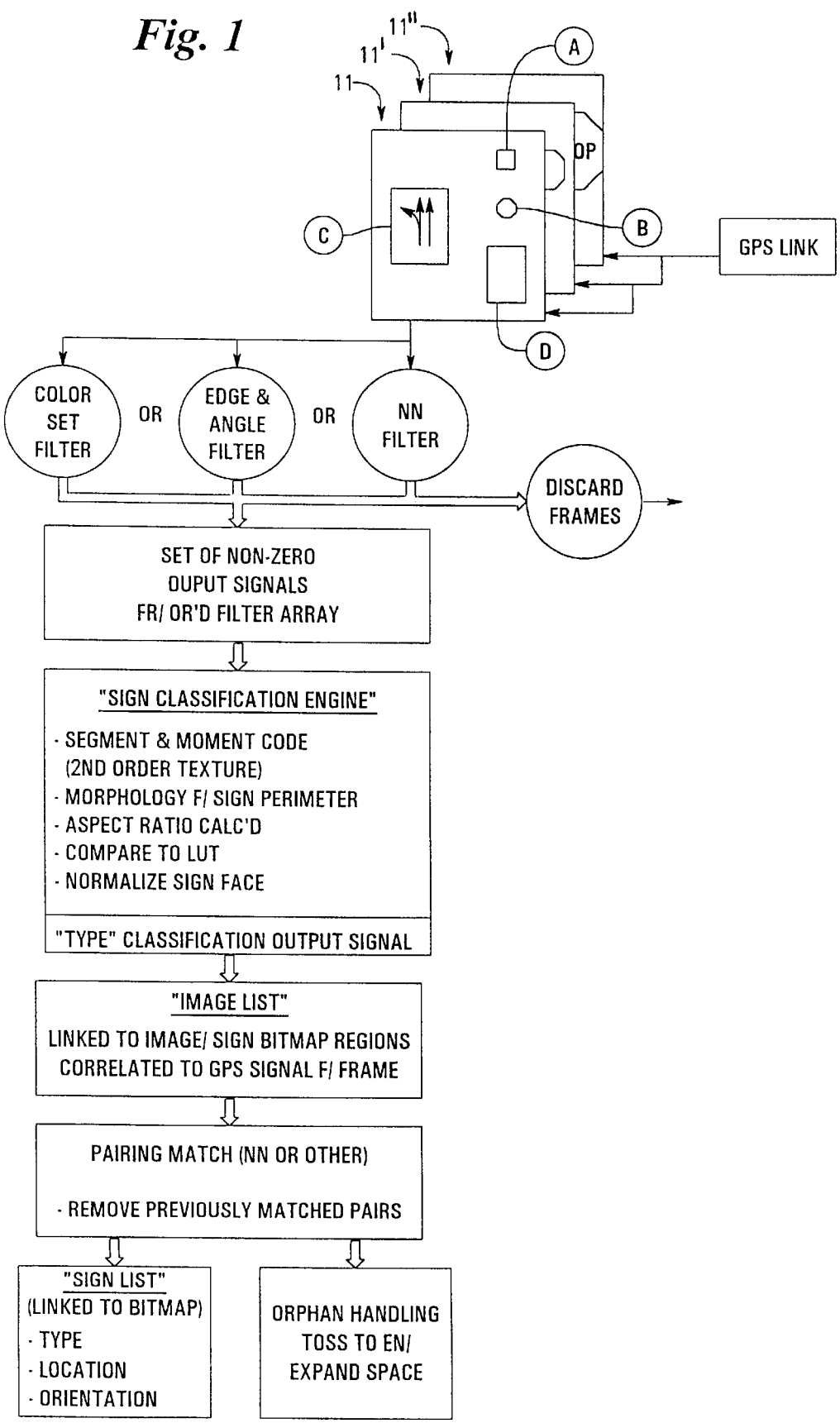
Figure 4:
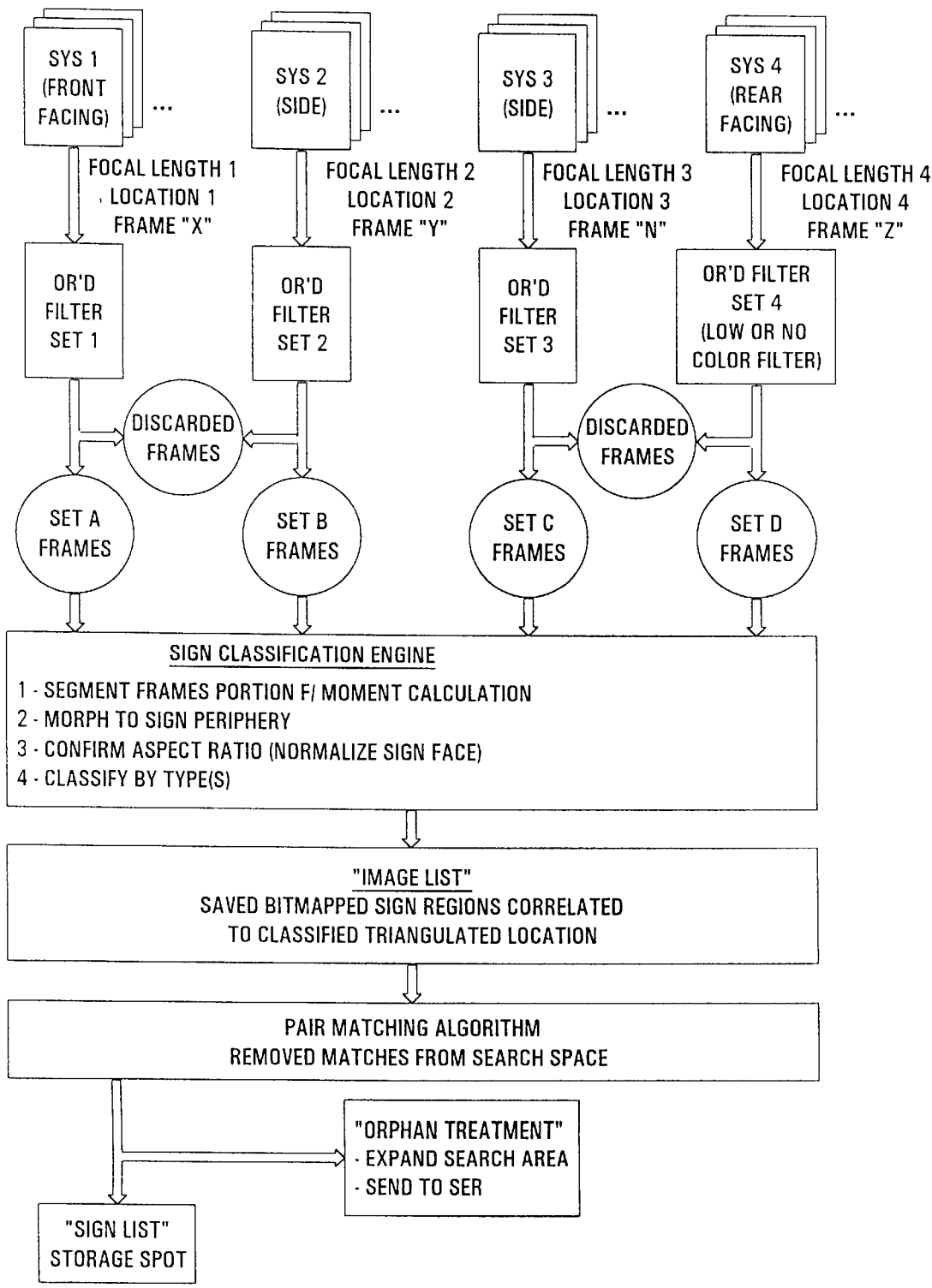
FIG. 4 depicts a processing system for classifying road signs appearing in image data from multiple imaging capture devices wherein capture devices SYS1 through SYS4 utilize unique recognition filter specifically developed for each said capture device (focal/optics, recording orientation, and camera/vehicle location specific for each imaging system).

The present invention is first described primarily with reference FIG. 1 wherein an image frame 11 which has captured a portion of a road side scene which basically is the same as a field of view 11 of camera 10 from the scene conveyed via optics 12 to a focal plane of camera imaging means 10 which preferably includes suitable digital imaging electronics as is known an used in the art. The scene depicted in frame 11 (or subsequent frames 22, 33, 44, etc.) of FIG. 4B can contain several objects (A, B, C, D) of interest disposed therein. In one embodiment of the present invention, a single imaging means 10 is directed toward the road side from the vehicle 46 as the vehicle navigates normal traffic lanes of a roadway. The imaging means 10 often comprises several imaging devices 20,30,40 wherein each possibly overlaps other camera(s) and is directed toward a slightly different field of view 22,33,44, respectively (see FIG. 4B) than the other imaging devices comprising imaging means 10 at objects A–D, etc. with sufficient clarity upon the suitable digital imaging electronics of imaging means 10 to derive chromatic and edge details from said electronics. The imaging means 10 can be multiple image means having a variety of optical properties (e.g., focal lengths, aperture settings, frame capture rate) tuned to capture preselected portions of a scene of interest. When multiple image means 10 are used to capture image frames each said image means 10 is electronically coupled to the processing system of the present invention and each is tuned with its own unique processing method(s) to optimize the quality/accuracy of the outputs therefrom so that all frame data not related to "images" of potential objects are filtered and then "images" of said objects compared in an "object search space" are compared so that all qualified images that correspond to a single object can be linked to said single object regardless which discrete imaging means 10 originally recorded the image(s) of the object. In this embodiment, a dedicated CPU for each imaging means 10 is provided to speed processing toward "real time" processing rates. Furthermore, said dedicated CPU could be provided from a single box CPU having many separate CPUs disposed therein, a networked group of linked CPU's, or a global network of linked CPU's (e.g., world wide web or internet-type network).

Typically, imaging means 10,20,20,40 are tuned so that approximately between five and forty percent (5–40%) of the available two dimensional image frame space are captured per single object when said single object is "fully depicted" in a given frame. If an object of known size thus fills a field of view of an imaging means 10, a rough estimate of actual distance from the camera may be calculated (and this data can be used if needed to assist the process of accurately finding the actual position of an recognized object in a scene).

The present invention operates sufficiently well under ambient lighting conditions when the imaging means 10 captures radiation from the visible spectrum. Although scene illumination may augmented with a source of illumination directed toward the scene of interest in order to diminish the effect of poor illumination and illumination variability among images of objects. However, the present invention is not dependent upon said additional source of illumination but if one is used the source of illumination should be chosen to elicit a maximum visual response from a surface of objects of interest. For example, source of illumination could be a high-intensity halogen bulb designed to create a maximum reflected signal from a surface of object and wherein object is a class of traffic control signs. In this way, at least one object present in a scene likely distinctly appears in a portion of two or more frames. Then a variety of logically OR'd extraction routines and filters extract image portions that exhibit said differentiable characteristics (which may be a slightly different set of characteristics than would be used for non-illuminated recording. As in the other embodiments, the video data stream is preferably linked to data for each imaging device (e.g., absolute position via GPS or d-GPS transponder/receiver, or relative position via INS systems, or a combination of GPS and INS systems, etc.) so the location of each identified object is known or at least susceptible to accurate calculation.

In one manner of practicing the invention, location data is synchronized to the video data from the imaging means 10 so that location and image information are cross-referenced to correlate the location of the object using known techniques of triangulation and assuming a set of known camera parameters. As described further herein, triangulation may be replaced or augmented if the camera recording perspective angle is a known quantity relative to the vehicle recording path and the vehicle location are known (an by applying known camera parameter values, such as focal length). Furthermore, if the pixel height or aspect ratio (herein used to describe area of coverage measures) of confirmed objects are known, the location of the object can be deduced and recorded. Thus, this data is synchronized so that each image frame may be processed or reviewed in the context of the recording camera which originally captured the image, the frame number from which a bitmapped portion was captured, and the location of the vehicle (or exact location of each camera conveyed by the vehicle) may be quickly retrieved.

A location matrix corresponding to the location of a confirmed object may be built from the output data sets of the present invention. At several points in the processing of the image frames, manual inspection, interaction, and/or intervention may be sought to further confirm the accuracy of the present invention as to the presence or absence of a potential object therein. Thus, an additional output may be stored or immediately sent to a human user which includes each "questionable" identification of an object wherein each said questionable identification event may be quickly, although manually, reviewed with reference to this data (and a simple "confirm" or "fail" flag set by a human user).

The preferred rate of video capture for digital moving cameras used in conjunction with the present invention is thirty (30) frames per second although still photos and faster or substantially slower image capture rates can be successfully used in conjunction with the present invention particularly if the velocity of the recording vehicle can be adapted for capture rates optimized for the recording apparatus. A high image capture rate creates latitude for later sampling techniques which discard large percentages of said frames in order to find a preselected level of distinguishing features among the images within the frames that are not discarded.

Road side objects frequently are partially obscured from the roadway by other vehicles and/or roadside features such as trees, signage, hedges, etc. High frame rates enable the present system to ignore these more difficult scenes (and corresponding image frames with little downside. Filtering may be done here to correct for known camera irregularities such as lens distortion, color gamut recording deficiencies, lens scratches, etc. These may be determined by recording a known camera target (real objects, not just calibration plates). Because the imaging vehicle is moving their motion causes a certain degree of blurring of many objects in many frames. A sharpening filter which seeks to preserve edges is preferably used to overcome this often encountered vehicle-induced recording error. Although this filter may benefit from, but does not require, a priori knowledge of the motion flow of pixels which will remain fairly constant in both direction and magnitude in the case of a vehicle-based recording platform.

The frame buffer 44 is preferably capable of storing 24 bit color representative of the object 40 represented in an RGB color space and the number of significant color bits should be five (5) or greater. The frame buffer 44 is subjected to an edge detector utility 55 as known in the art (and which can be directly coded as assembly language code as a simple mathematical function), such as the Sobel extractor. The inventors note that the convolving filters used herewith (and in fact the entire class of convolving filters) may be simply coded in assembly language and benefit greatly from SIMD instructions such as MMX as used in the Pentium II computer processors of Intel Corporation, of Santa Clara, Calif., U.S.A., which speeds processing and eliminates a margin of processing overhead. The frame buffer is separated into two channels of data, a first data set of edge data and a second data set of color data. As earlier mentioned only a small subset of high-reflectance colors are typically authorized for use as road sign colors, and furthermore, the set of colors authorized can be generally characterized as non-typical colors (i.e., occurring only in conjunction with objects of interest).

Information about a series of at least two (2) images in different image frames is needed (prior to the images to be "combined" into a single confirmed object) and the information about each confirmed object is preferably saved in a parametric data format (i.e., as scaleable data).

Either a thresholding routine, a fuzzy color set, or a neural network can be used to the extract relevant color-set data. The effect is simply to alter the range of colors that will successfully activate a flag or marker related to the color data set so that small variations in color of the sign (due to different illumination of images of the same object, UV exposure, different colorants, different manufacturing dates for the colorant, etc.) do not tend to create erroneous results. Accordingly, thresholding red to trip just when stop sign-red is detected in combination with the rule set of relative location of different types of signs helps eliminate pseudo-signs (something that looks something like a sign of interest, but isn't). In the event that a portion of a sign is obscured (either by another sign, or by unrelated objects) just two (2) opposing corners for four-sided signs, and three (3) corners that do not share a common edge for six and eight-sided signs (as exhibited by two intersecting edges which meet at a set of detectable, distinctive characteristic angles) is typically required to identify whether an appropriate edge of a real sign has been encountered. A special aspect of signs exploited by the present invention is that most road signs have a thin, bold strip around substantially the entire periphery of the face of the sign. This bold periphery strip is often interrupted where small sign indicia are typically printed. Thus the characteristic striping operates as a very useful feature when reliably detected as is possible with the present invention and in practical terms this border offers two (2) opportunities to capture an edge set having the proper spatial and angular relationships of an object thereby increasing the likelihood that a sign having a typical border will be accurately and rapidly recognized by the present inventive system.

Then, if the image illumination is sufficient for color detection the type of road sign can be determined by filtering the color data set with the inventive hysteresis filter described herein. This allow detection of signs appearing adjacent to red stop signs that might otherwise appear as another color to the camera (and perhaps to a camera operator). Because in the U.S. informational signs are typically white or blue, directional and jurisdictional signs are typically green, and caution signs are typically yellow, which all produce relatively subtle discontinuities compared to red stop signs, detecting the subtleties among the former presents a difficulty economically solved by the present invention. In conjunction with the color data set, and given an assumption that the videostream depicting the road side signage was captured by a vehicle navigating in a normal traffic lane, the location of a road sign (in a temporal and literal sense) in successive frames helps indicate precisely the type of sign encountered. Further, the inventive system herein described further takes advantage of the limited fonts used for text appearing on road signs as well as the limited types of graphical icons depicted on certain signs. This type of sign indicia can be put into a normalized orientation and simple OCR or template-matching techniques readily and successfully applied. These techniques work especially well in cooperation with the present invention because the segmentation and normalization routines have removed non-sign background features and the size and position of the sign indicia are not variant. With respect to road signs painted on the surface of a road the color, message, shape, sequence, and location relative to a typical vehicle allow rapid and accurate identification using the present invention. In particular, use of a text segmenting routine practically causes the entire road to fail to record a meaningful value and the "sign" on the road becomes readily apparent (e.g., stripes, lines, messages, arrows, etc.).

Once an image (portion of an image frame) has been created and stored in the image list database then the area of the sign is marked in the frame. This marked region is the perimeter eroded at least one full pixel. This area is not considered to be part of any other sign. The scene is then reprocessed after having re-initializing all the adaptive parameters and hysteresis filters, surround inputs are changed also on the nth pass from the N−1 pass. For example, after an image portion depicting a stop sign is marked and essentially removed from the image frame during later re-processing of the image frame, the pixels corresponding to said marked region are set to a null value. This aids later processing techniques that compare a number of adjacent pixels in order to identify boundaries of signs. Thus a potential source of bias; namely, prior pixel values from the originally recorded image from are removed during later processing and to the extent that the values of a set of pixels in said removed area are needed for boundary or edge detection. This single hysteresis filter therefore is highly adaptable and useful in practicing the present invention since it operates effectively in the growing of areas exhibiting a common color set (or "bucket" of color defined as the subtle variety of colors commonly observed as single road sign color as a result of changing viewing conditions) and it operates effectively as an progressively finer hysteresis filtering wherein the discontinuities become less readily apparent. For example, a red sign creates a relatively sharp discontinuity relative to almost all background colors. Once identified as an image portion of interest, and removing said image portion, later full image frame processing for other discontinuities will likely need to accurately discern between shades of white and blue, yellow, or green. In these cases, the technique just described greatly enhances the ability to rapidly extract a variety of signs present in even a single image frame using just the inventive hysteresis filter.

Two sets of data, edge data and the color data are fed to an input node of a preferably three layer neural network which adds an entry to a 3D structure based on the location of a portion of the frame buffer 44 presently being processed. In effect, the 2D image contained in any given frame buffer is processed and compared to other frame buffers to create 3D regions of interest (ROI). In this context, the ROI refers to a fabricated space which contains a length of video so that a number of possible objects due to a either color, edge features, location to other possible objects, etc. Another way to consider the ROI is as a volumetric entity that has position and size both specified in a 3D space. This ROI is used as a search query into the set of all images. They are searched based on inclusion in a predefined ROI. This database includes all the "images"and so this searching occurs after the processing of all the data (i.e., extracting and filtering of a set or segment of image frames). This data may have been collected at different times including different seasonal conditions. The intersection of the sets of signs present will be identified as signs and can be identified with special processing appropriate for such signs (e.g., winter parking signs, temporary construction signs, detour signs, etc.). Regardless, of the number or types of classes for the signs, the database is stored as a octree tree or any comparable searchable 3D memory structure.

During operation of the present invention all detected images of signs are assigned to an "image list" and by sequentially attempting to match "closely separated" pairs of images in an octree space of common classification, a "sign list" is generated. Once two or more members of the image list are matched, or "confirmed" as a single actual sign, each image is removed from further searching/pairing techniques. A dynamically-sized region of interest (ROI) which can be interpreted as a voxel, or volume pixel, populated by several images for each actual sign is used to organize the image list into a searchable space that "advances" down the original recorded vehicle roadway as transformed to many discrete images of the actual signs. Thus, the ROI is continually advanced forward within the relative reference frame of the vehicle and after each pair is correlated to a single sign, their corresponding records in the image list are removed. During this process, where a single orphan image (non-confirmed, possible sign) appears it is culled to an orphan list which is then subjected to a larger search space than the first ROI to try to find a correlation of the single image to another corresponding image and/or ported to a human user for interpretation. This may result in the image being merged into a sign using relaxed matching constraints because it is known from the absolute position of the sign and the known arc of possible positions and the use of simple depth sorting that can "prove" they are the same sign. This can be done even when the intersection of the sets of shared spatial features is empty. At this point the GPS or location database can be consulted to further aid identification. Manual review of a "best" selected and saved bitmap image of the unidentified object further enhances the likelihood of accurate identification and classification of the image object and presently the inventive system saves every image but culls all but the eight (8) or so having the highest magnitude signal from the initial filter sets.

Preferably, there are three (3) basic filters used to recognize a portion of an image frame as a sign which deserves to have membership in the "image list." Edge intersection criteria are applied albeit relaxed (the edges are transformed into "lines of best fit" in Hough space by using adaptive sizing, or "buckets,") so that valid edge intersections exhibiting "sign-ness" are found; color-set membership; and neural net spatial characteristics. As noted above, the Fourier transform recognition techniques suffer from a reliance on the frequency domain where many background objects and non-objects exhibit sign-ness as opposed to the spatial domain used beneficially herein where such potential errors (or false positives) are encountered. Using a compressed histogram of the color of the face of a sign allows in a highly compressed bitmap file and if a boundary edge of the sign is reduced so that only a common shade (or color) is present the compression of the image frame portion can be very efficient. The inventors observe that even very small (1–2 pixels) spots of detectable color can be used for relatively long range confirmation of object color.

The inventors suggest that up to thirty to forty (30–40) images per sign are often available and adequate to scrutinize but at a minimum only one (1) reasonable depiction of an actual sign is required to perform the present inventive technique (if object size and camera location are known) and only approximately three (3) images are needed to provide extremely high identification accuracy rates. In a general embodiment, the present invention is configured as a graphic-based search engine that can scrutinize an extremely large number of frames of image data to log just a desired single object recognition event.

To reiterate the coined term "sign-ness" it is used herein to describe those differentiable characteristics of signs versus characteristics of the vast majority of other things depicted in an image frame that are used to recognize signs without use of reference targets, templates, or known image capture conditions. Thus, a general embodiment of the present invention is herein expressly covered by the disclosure herein in which the presence of any object of interest, or portion of such an object, can be discretely recognized provided said object of interest comprises a discrete set of differentiable qualities in comparison to other elements of a scene of interest. To paraphrase, each image frame is discarded if it exhibits little or no "sign-ness" because the image frame either does not hold an image of a sign or insufficient detail of a sign to be useful. Stated a different way, the present invention uses partial function weight analysis techniques to discard useless frames (e.g., frames without a sufficient amount of a differentiable color, edge definition, or other differentiable feature of a desired object) and/or a relaxed confidence interval that strongly weights approximate minimum basis function elements known to produce a correlation to a real world object.

The concept of further classification of identified objects can include capture and analysis of text and other indicia printed on an object by using suitable normalization routines or extractors and specifically include well known OCR and template-based matching techniques. These routines and extractor engines allow for size, position, and rotational variances of said indicia. Thus, for example, this allows classification of objects to a much more detailed level. In the sign-finding embodiment, this means that detailed information can be captured and compared. This allows sorting or searching for all instances where the phrase "Nicollet Avenue" appears, where the phrase appears on corner street signs versus directional signs, or wherein all signs identified and located on a street named Nicollet Avenue can be rapidly retrieved, displayed, and/or conveyed.

The inventors have produced embodiments of the present invention using relatively cheap (in terms of processing overhead) functions in order to rapidly and efficiently process the video data stream. Initial screen may be done on scaled down version of the frame buffer. Later filter may be run on the full size data or even super sampled versions of the full size data. Thus, certain functions applied to the video data stream quickly and easily indicate that one or more image frames should be discarded without further processing or inspection and their use is promoted as an expedient given the present state and cost of processing power. For example, if only standard stop signs need to be recognized and their position logged, shape is a key distinguishing, dispositive feature and a search function based solely on shape will adequately recognize a stop sign even if the video data stream depicts only the unpainted rear of the stop sign.

The neural network preferably used in conjunction with the present invention is a three layer feed forward neural network having a single input layer, hidden layer, and an output layer. The back propagation data for training the network typically utilize random weights for the initial training sets applied to assist the neural network learning the characteristics of the set of objects to be identified and the training sets preferably consist of sets with and without objects depicted therein, real-world sets, and worst-case sets. Those nodes of the neural network used to encode important spatial features will vary proportionally to the input resolution of the frame buffer 44 and is dynamically reconfigurable to any resolution. The neural network needs to learn size invariance, which is typically a tough problem for neural networks, and thus the training sets assist the neural network in distinguishing a "little" from a "big" object and matching them based on shape (the object seems to grow in the frame buffer as it nears the image acquisition apparatus). Size variation is further controlled by cutting off recognition of small (less than 5% of frame) images and also by using a unique neural network for each camera. Camera orientation and focus produce remarkably similar size views particularly on side-facing cameras because of their approximate orthogonal orientation to the direction of travel and the signs closeness to the road on which the vehicle is traveling. The neural network preferably uses what are known as convex sets (which exhibit the ability to distinguish between information sets given only a single (or a most a few) select criteria. In the preferred embodiment, shape and color, color edges, color differences, corners, ellipsicity, etc. of the images identified as potential objects are used to create this differentiability among signs. As earlier noted, when more than one image acquisition means 10 are used for a single scene of interest, each image acquisition means 10 needs to have a separate neural network trained on the types of image frames produced by each image acquisition means.

Hexagonal, rectangular, and diamond shapes are preferably encoded in the training sets for the neural network so that an n-feature object may be recognized without any direct relationship to only color, shape, and/or edge rotation.

The principles of "morphology" are preferably applied to dilate and erode a detected sign portion to confirm that the object has an acceptable aspect ratio (circularity or ellipsivity—depending on the number of sides) which is another differentiable characteristic of road sign used to confirm recognition events. These can be described as "edge chain" following where edge descriptors are listed and connected and extended in attempts to complete edges that correspond to an actual edge depicted in a frame. Morphology is thus used to get the "basic shape" of an object to be classified even if there are some intervening colored pixels that do not conform to a preselected color-set for a given class or type of sign. In the preferred embodiment, a color data set can begin as a single pixel of a recognizable color belonging to the subset of acceptable road sign colors and the morphology principles are used to determine shape based on at least a four (4) pixel height and an ten (10) pixel width. The frame, or border stripe of most signs, has to decompose to the orientation transformation of the small templar (i.e., they must share a common large-size shape in a later frame and must decompose to a common small-size templar feature—typically at a viewing horizon).

Furthermore, texture "segmentation" as known in the art, can be applied to an image, particularly if one or more line and/or edge filters fail to supply a an output value of significant magnitude. One feature of texture segmentation is that one very large feature of many image frames, the road itself, buildings, walls, and the sky all disappear, or fail to record a meaningful output, under most texture segmentation routines.

Figure 2A:
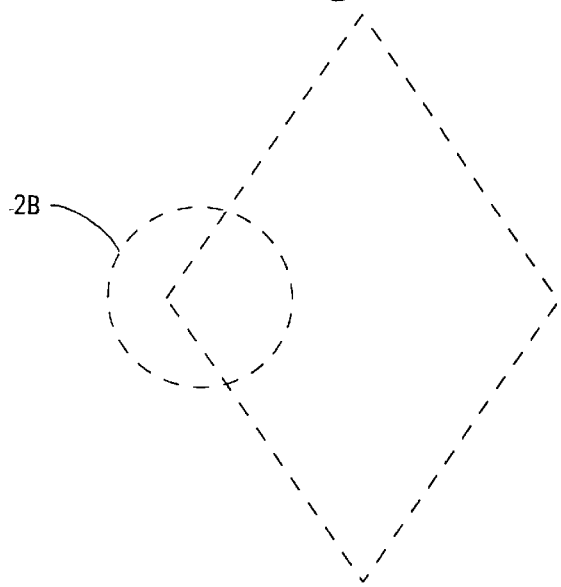
Figure 2B:
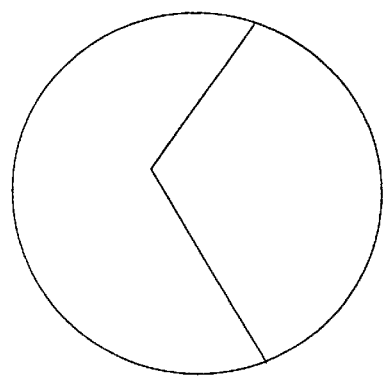
Figure 2C:
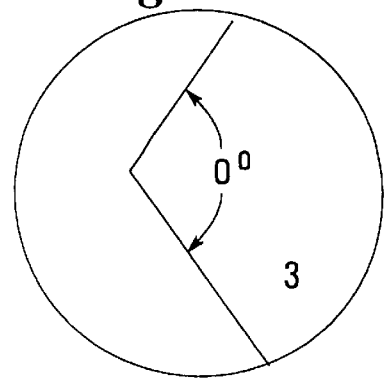

Referring now to FIGS. 2A, 2B, and 2C which depict a portion of a image frame wherein parts of the edges of a potential object are obscured (in ghost), or otherwise unavailable, in an image frame (2A), and the same image frame portion undergoing edge extraction and line completion (2B), and the final enhanced features of the potential object (2C).

Figure 3A:
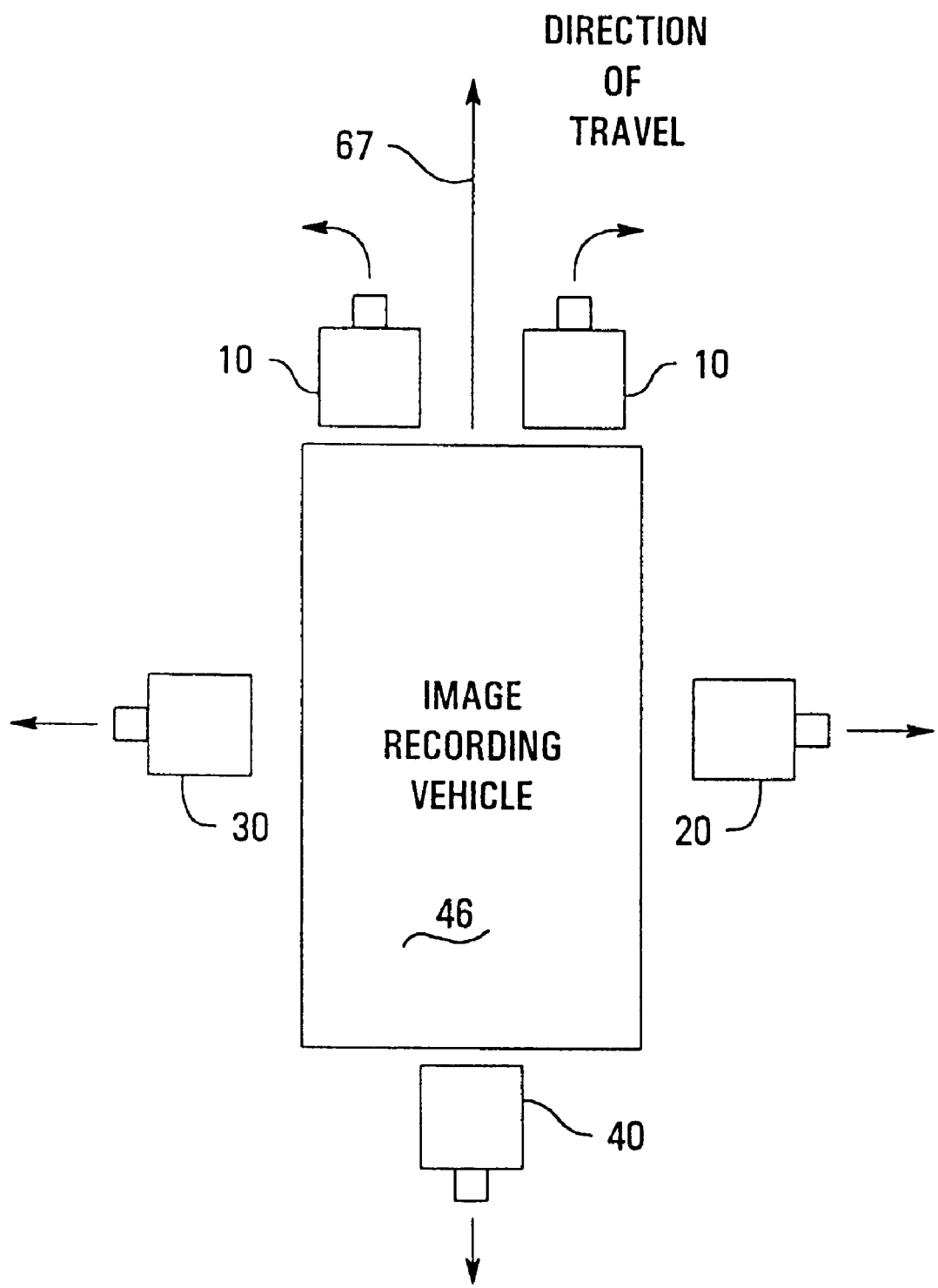
FIG. 3A depicts a plan view of a propelled image acquisition vehicle system and FIG. 3B depicts a vehicle having multiple weather hardened camera ports for recording features adjacent a vehicle right-of-way (each side, above, on the surface of the right-of-way, and a rearward view of the recording path).
Figure 3B:
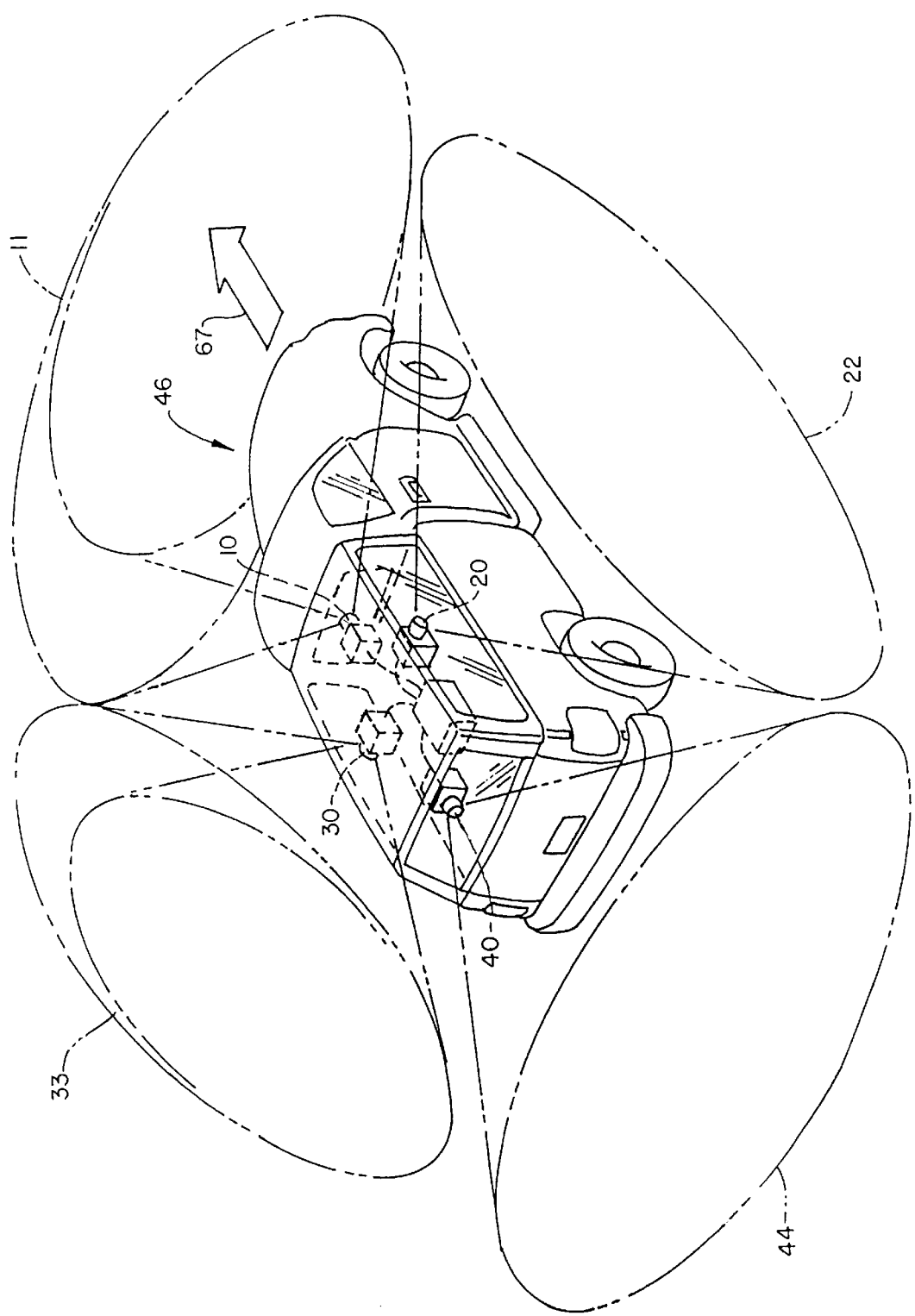

Referring now to FIG. 3A and FIG. 3B which each depicts a propelled image acquisition vehicle 46 conveying imaging systems 10,20,30,40 each preferably comprises of unique cameras tuned to optimally record road signs and other featured objects adjacent a vehicle right-of-way. While two cameras are perceived as the best by the inventors the present invention operates adequately with several cameras each covering at least those objects on each side of the road, above the road surface, on the surface of the road, and a rearward view of the recording path. In alternative embodiments the inventors envision at least two cameras oriented on a vehicle traveling down a railroad right of way in which the processing techniques are trained to recognize the discrete objects of interest that populate the railroad bed, railway intersections, roadway crossings, and adjacent properties without departing from the spirit and strength of the present invention.

Figure 5:
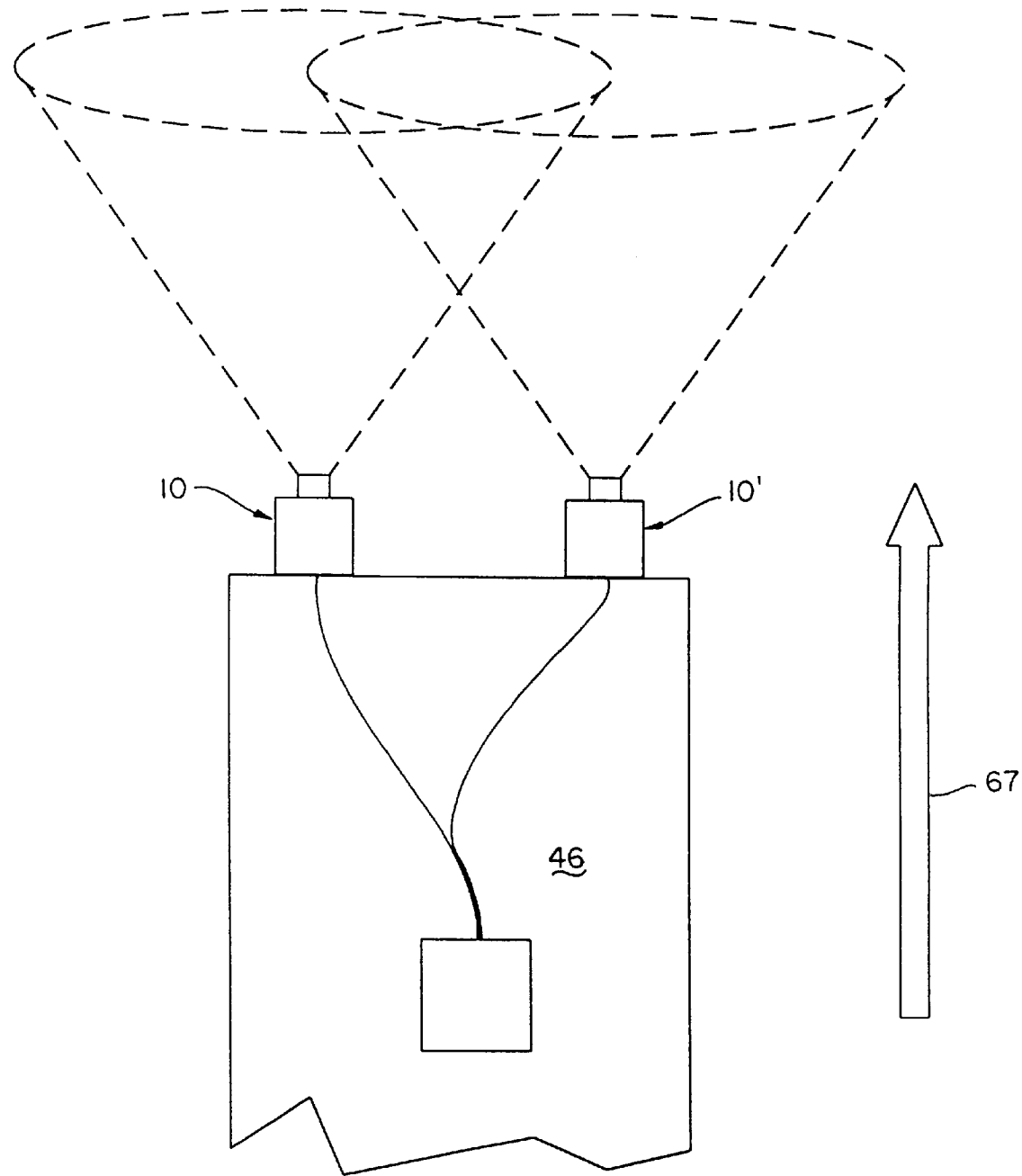
FIG. 5 depicts a plan view of a preferred camera arrangement for use in practicing the present invention wherein two image capture devices record road signs are directed in the direction of travel of the vehicle.

Referring now to FIG. 5 which is a view depicting a preferred embodiment of the present invention wherein the four imaging devices 10,20,30,40 are combined into a single road sign detection system.

In summary, in the exemplary road sign identification embodiment, a videostream containing a series of signs in one or more frames is subjected to processing equipment that rapidly applies extraction routines to quickly cull the typically high number of useless images from the useful images. Fortunately, road signs benefit from a simple set of rules regarding the location of signs relative to vehicles on the roadway (left, right, above, and a very limited set of painted-on-road signs and markings), the color of signs (preferably limited to discrete color-sets), the physical size and shape of signs, even the font used on text placed upon signs, indicia color, indicia shape, indicia size, and indicia content, the orientation of the signs (upright and facing oncoming traffic), and the sequence in which the variety of signs are typically encountered by the average vehicle operator. Because of the intended usage of these signs for safety of vehicles these standards are rigidly followed and furthermore these rules of sign color and placement adjacent vehicle rights of way do not vary much from jurisdiction to jurisdiction and therefore the present invention may be used quickly for a large number of different jurisdictions. Furthermore, pedestrian, cycle, and RV path signage identification may likewise benefit from the present invention. Although the border framing the road sign has been described as one of the most easily recognized features of road signs (and in many cases is dispositive of the issue of whether or not a sign is present in an image frame) the present system operates effectively upon road signs that do not have such a border. If a sign is reclined from normal, only a portion of the border frame is needed to ascertain whether the image portion is a portion of a road sign by creating a normalized representation of the sign (typically just the top edge). Another such technique applies Bayesian techniques that exploits the fact that the probability of two events occurring at the intersection of the two possibilities. Other techniques are surely known to those of skill in the art.

Figure 6:
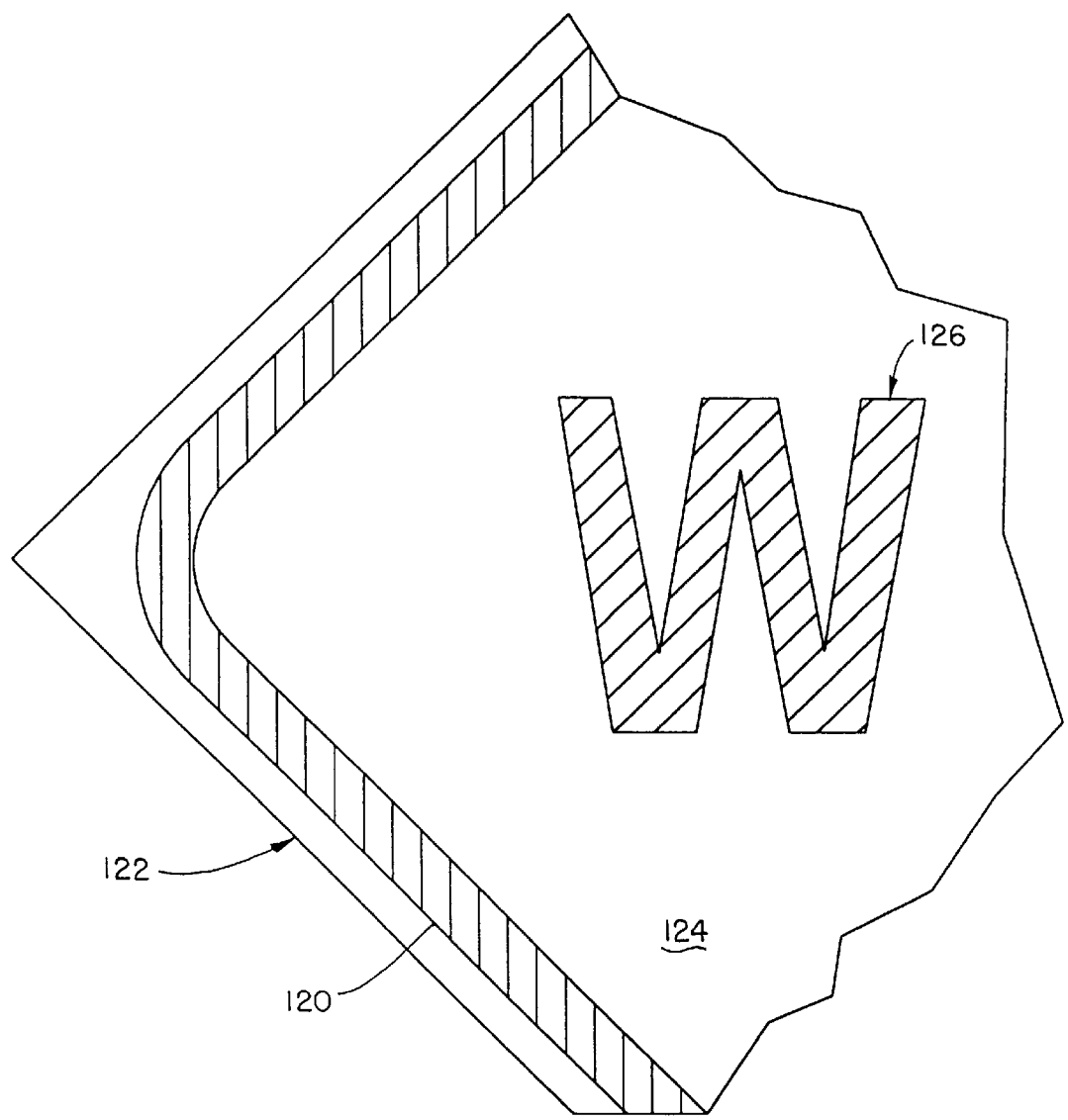
FIG. 6 is an enlarged view of a portion of a typical road sign depicting a border region, an interior portion of solid color, and the outline border appearing thereon.
Figure 7A:
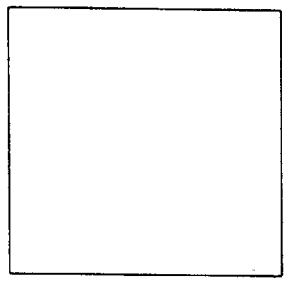
Figure 7B:
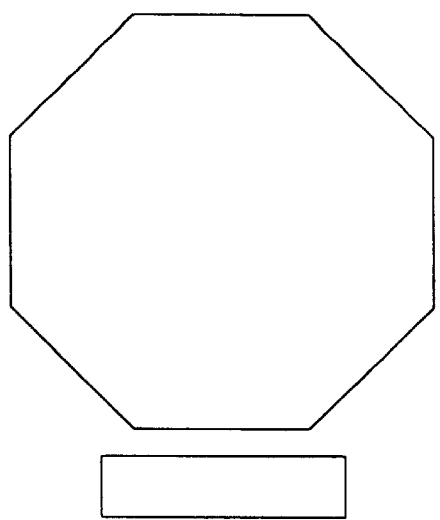
Figure 7C:
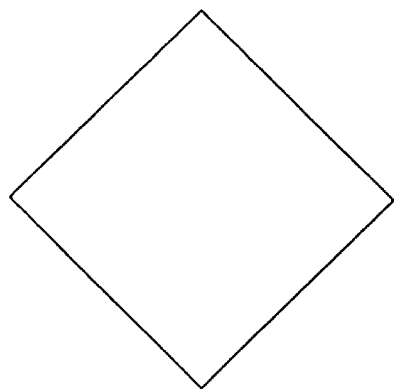
Figure 7D:
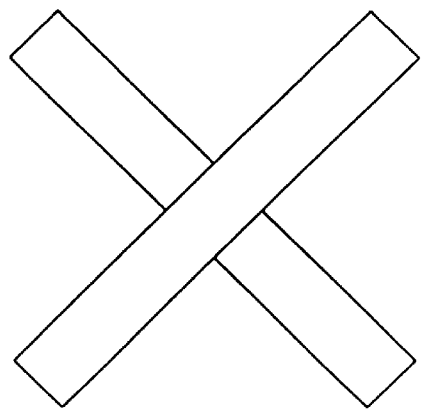
Figure 7E:
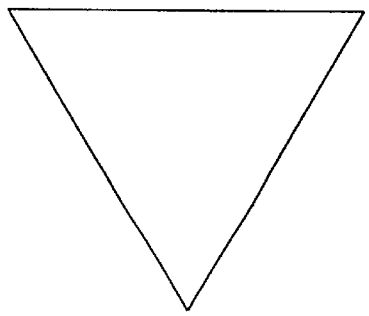
Figure 7F:

Referring to FIG. 6, an optimum image gathering vehicle is depicted having at least two image capture devices directed toward the direction of travel of said vehicle.

Referring to FIGS. 7A–F are views of the outlines of a variety of common standard U.S. road signs.

Hardware platforms preferred by the inventors include processors having MMX capability (or equivalent) although others can be used in practicing the present invention. One of skill in the art will appreciate that the present apparatus and methods can be used with other filters that are logically OR'd together to rapidly determine "object-ness" of a variety of objects of interest. The differentiable criteria used in conjunction with the present invention can vary with the characteristics of the objects of interest. For road signs, the inventors teach, disclose, and enable use of discrete color-sets or edges (extracted and/or extended to create a property best described as "rectangularity") or orientation of a sign to the roadway for only one view of the roadside from a single recording device or texture to rapidly discern which image frames deserve further processing. A net effect of this hierarchical strategy is the extremely rapid pace at which image frames that do not immediately create an output signal from one of the filters of the filter set are discarded so that processing power is applied only to the image frames most likely to contain an object of interest. The inventors suggest that the inventive method herein taught will propel the technology taught, enabled, and claimed herein to become widely available to the public. Thereafter, myriad valuable implementations of the technology presented herein shall become apparent. Other embodiments of the present invention included are easily realized following exposure to the teaching herein and each is expressly intended to be covered hereby.

Further, those embodiments specifically described and illustrated herein are merely just that, embodiments of the invention herein described, depicted, enabled and claimed, and should not be used to unduly restrict the scope or breadth of coverage of each patent issuing hereon. Likewise, as noted earlier, the invention taught herein can be applied in many ways to identify and log specific types of objects that populate a scene of interest to assist in vehicle navigation, physical mapping/logging status by object location and type, and identifying, linear man-made materials present in a scene generally populated by natural materials.

EXAMPLE 1

A method of recognizing and determining the location of at least one of a variety of road signs from at least two image frames depicting at least one road sign wherein available known values regarding the location, orientation, and focal length of an image capture device which originally recorded the at least two image frames, comprising the steps of:

receiving at least two image frames that each depict at least a single common road sign and which correspond to an identifier tag including at least a one of the following items: camera number, frame number, camera location coordinates, or camera orientation;

applying a fuzzy logic color filter to said at least two image frames;

filtering out and saving image frame portions containing each region that contain at least one preselected color-pair of a pair-set of approved road sign colors; and saving to a memory location said image frame portions of the at least a single common road sign depicted in one of said at least two image frames which is linked to at least a one of the following items: a camera number, an image frame number, a set of camera location coordinates, or a camera orientation direction used for recording.

EXAMPLE 2

An method for recognizing an object and classifying it by type, location, and visual condition from a digitized video segment of image frames comprising the steps of:

applying two filters to an image frame wherein the two filters each capture at least one differentiable characteristic of the object of interest;

extracting a first data set and a second data set from said two filters;

comparing said first data set and said second data set to threshold values;

discarding said image frame if the first or second data set do not exceed the threshold and adding said image frame to an image frame library of possible images depicting actual objects.

EXAMPLE 3

A method for identifying similar objects depicted in at least two bitmap frame buffers of a digital processor, comprising the steps of:

receiving a digital image frame that corresponds to a unique camera, a camera location, an image frame reference value;

applying a set of equally weighted filters to said image frame wherein each of said equally weighted filters each creates an output signal adjusted to reflect the magnitude of a different differentiable characteristic of an object of interest;

OR-ing the resulting output signals from each of the equally weighted filters and saving only those image frames in which at least one of the equally weighted filters produces the output signal having a local maximum value.

EXAMPLE 4

A method of identifying traffic control signs adjacent a vehicle right of way, comprising the steps of:

receiving a digital videostream composed of individual image frames depicting a roadway as viewed from a vehicle traversing said roadway;

iteratively comparing bitmap frames of said videostream to determine if a first bitmap pixel set matches a second bitmap pixel set in terms of reflectance, color, or shape of an object depicted therein;

placing all members of the first pixel set and the second pixel set that match each other in an identified field of a database structure;

synchronizing a geo-positioning signal to the identified field; and storing a representative bitmap image of either the first pixel set or the second pixel set in conjunction with the geo-positioning signal.

EXAMPLE 5

A method of rapidly recognizing road signs depicted in at least one frame of a digital videosignal, comprising the steps of:

applying at least two equally weighted filters to at least one frame of a digital depiction of a road side scene so that for each of the at least two equally weighted filters a discrete output value is obtained;

comparing the discrete output value for each respective said at least two equally weighted filters and if a discrete output of at least one of said at least two equally weighted filters does not exceed a reference value then discarding the at least one frame of digital videosignal, but if one said discrete output exceeds a reference value; and then setting a road sign "image present" flag for said at least one frame of a digital videosignal;

further comprising the steps of saving a bitmap image of a portion of said at least one frame of digital videosignal recording a location data metric corresponding to the location of the camera which originally recorded the at least one frame of digital videosignal; and wherein the location data metric further comprises the direction the camera was facing while recording, the focal length of the camera, and the location of the camera as recorded by at least one global positioning device.

Although that present invention has been described with reference to discrete embodiments, no such limitation is to be read into the claims as they alone define the metes and bounds of the invention disclosed and enabled herein. One of skill in the art will recognize certain insubstantial modifications, minor substitutions, and slight alterations of the apparatus and method claimed herein, that nonetheless embody the spirit and essence of the claimed invention without departing from the scope of the following claims.

What is claimed is:

1. A method for automatically generating a database of images and positions of objects of interest comprising the steps of:

providing video images that are recorded from a vehicle navigating a road and having a system that stores location metrics for those video images;

filtering said video images to identify image frames having potential objects of interest and discarding all other image frames;

analyzing said image frames having potential objects of interest to identify an object of interest common to and contained in at least two different image frames;

storing in a database at least a pointer to a portion of one image frame of said video images corresponding to each object of interest;

determining a location data metric for each object of interest based on a location data metric of said vehicle when each of said at least two different image frames corresponding to said object of interest was originally recorded and an analysis of a position of said object of interest in said at least two different image frames; and storing in said database said location data metric determined for each object of interest.

2. The method of claim 1 wherein the step of filtering said video images further comprises the steps performed for each image frame of:

applying at least two separate filters to said image frame to generate a discrete output value from each filter, wherein each of at least two of said filters screens for a differentiable characteristic associated with an object of interest that is unique to that filter;

comparing the discrete output values for each of said at least two filters to at least one reference; and identifying said image frame as potentially having an object of interest if at least one of the discrete output values indicates a differentiable characteristic is present for said image frame when the discrete output values are compared to the at least one reference.

3. The method of claim 2 wherein each of said at least two filters is selected from the set of the following filters: an edge filter, a color-pair filter, a color filter operating in the L*u*v color space, an edge filter combined with a line extender, or a color filter operating in the LCH color space.

4. The method of claim 2 wherein the differentiable characteristics of each of said at least two filters is selected from the set comprising: color characteristics, edge characteristics, texture characteristics, symmetry, convexity, lack of three dimensional volume, number and orientation of side edges, characteristic corner angles, frequency and luminescence.

5. The method of claim 1 wherein the step of analyzing said image frames includes the steps of:

for each image frame identified as having an object of interest present:

segmenting said image frame into at least one region of interest;

applying at least one filter to each of said regions of interest which differentiates between various types of objects of interest so as to classify each of said regions of interest by type;

storing at least a portion of a bitmap corresponding to each region of interest in said image frame, said record including information identifying the type of object of interest classified from said at least one filter;

iteratively comparing bitmaps of at least two regions of interest to determine whether an object of interest is common to each of said two regions of interest; and if there is a match, storing in said database at least an indication for at least one of the video images having said matching regions of interest that a common object of interest is depicted in multiple image frames.

6. The method of claim 5 wherein the step of iteratively comparing includes the step of iteratively comparing bitmaps of said at least two frames of said video image to determine if a first bitmap pixel set matches a second bitmap pixel set in terms of reflectance, color, shape or any combination thereof for the object of interest.

7. The method of claim 6 wherein the step of storing at least a portion of a bitmap includes the steps of:
placing all members of the first pixel set and the second pixel set that match in an identified field of said database;
synchronizing a location data metric to the identified field; and
storing in said database at least a pointer to a representative bitmap image of either the first pixel set or the second pixel set in conjunction with said location data metric.

8. The method of claim 1 wherein the step of analyzing said image frames includes the steps of:
for each image frame identified as having an object of interest:
segmenting said image frame into a plurality of non-overlapping image segments;
identifying a segment that exhibits a differentiable characteristic as a search space; and
expanding said search space to include segments adjacent to said segment that exhibits the differentiable characteristic.

9. The method of claim 8 wherein the step of expanding further comprises the step of:
utilizing morphology techniques to grow and erode said search space by adding or subtracting segments adjacent said search space until either said search space meets or fails to meet uniform criteria for a differentiable characteristic.

10. The method of claim 1 wherein the step of analyzing said image frames includes the steps of:
applying a fuzzy logic color filter to said at least two different image frames to segment as separate image portions from said at least two different image frames each region that contains a group of pixels all having a color-set from a set of at least one pre-selected color-set associated with a type of object of interest; and
saving each of said separate image portions as a potential object of interest.

11. The method of claim 10 further including prior to completing the step of applying the fuzzy logic color filter, the step of converting said at least two different image frames from a native color space to a single color space portion of a L*u*v color space and wherein the fuzzy logic color filter provides a value output signal that is at a maximum for only said set of at least one pre-selected color-sets.

12. The method of claim 11, wherein the value output signals of the fuzzy logic color filter for each pixel are determined by location in said L*u*v color space and wherein the value output signals are assigned to a minimal set of mathematically described colors representing all of the legal color names and combinations of said set of at least one pre-selected color sets.

13. The method of claim 10 wherein the fuzzy logic color filter segments the separate image portions such that each image portion contains a range of colors related to said color set whereby variations between colors of individual pixels are allowed to exist in said group of pixels that comprise each image portion.

14. The method of claim 1 wherein the step of storing in said database said location data metric comprises storing at least an orientation of a camera while recording said image frame, a focal length of the camera and the location of the camera.

15. The method of claim 1 wherein said location data metric is determined for said object of interest by using triangulation techniques that assume a known location of at least one camera and a set of known camera parameters.

16. The method of claim 15 wherein the step of providing video images of roadside scenes utilizes multiple cameras in said vehicle to record said video images and the triangulation techniques uses multiple image frames from said multiple cameras.

17. The method of claim 1 wherein the step of storing in said database said at least a pointer to a portion of said image frame includes the steps selected from the set consisting of: storing a pointer to a portion of said image frame in said frame buffer; setting a flag that an object of interest is present, storing a description of a portion of said image frame; storing a portion of said image frame, storing said image frame, storing multiple image frames of a common road sign image, or any combination thereof.

18. The method of claim 1 wherein said step of filtering discards a large percentage of said images frames.

19. The method of claim 18 wherein at least ninety percent (90%) of said image frames are discarded by said step of filtering.

20. The method of claim 1 wherein said image frames potentially containing potential objects of interest are recorded and filtered such that approximately between five and forty percent (5–40%) of an available two dimensional image frame space contains an object of interest.

21. The method of claim 1 wherein said objects of interest are comprised of man-made materials having outlines at least a portion of which are generally linear in a scene generally populated by natural materials.

22. A computer system for automatically generating a database of images and positions of objects of interest comprising:
a frame buffer that stores at least one frame of a series of digital images depicting roadside scenes that are recorded from a vehicle navigating a road and having a system that stores information corresponding to a location of said vehicle when those digital images were recorded;
a filter system that distinguishes image frames stored in the frame buffer having potential objects of interest from all other image frames and discards all image frames not having potential objects of interest;
a processor that analyzes each frame in the frame buffer to identify a plurality of images of objects of interest; and
a database into which the processor stores at least a pointer to a portion of an image frame of said video images corresponding to each of said plurality of objects of interest identified by the computer system and a location data metric corresponding to a location for each of said plurality of objects of interest.

23. The system of claim 22 wherein said filter system comprises:
at least two separate filters operably connected to said frame buffer to generate a discrete output from each filter in response to each to said frame in said frame buffer, wherein each of at least two of said filters screens for a differentiable characteristic associated with a n object of interest that is unique to that filter; and
a neural network operably connected to said discrete outputs of said at least two separate filters to identify a frame of said digital images as potentially having a road sign present in response to said discrete outputs of said at least two separate filters.

24. The system of claim 23 wherein each of said at least two filters is selected from the set of the following filters: an edge filter, a color-pair filter, a color filter operating in the L*u*v color space, an edge filter combined with a line extender, or a color filter operating in the LCH color space.

25. The system of claim 23 wherein the differentiable characteristics of each of said at least two filters is selected from the set comprising: color characteristics, edge characteristics, texture characteristics, symmetry, convexity, lack of three dimensional volume, number and orientation of side edges, characteristic corner angles, frequency and luminescence.

26. The system of claim 22 wherein for each image frame identified as having a potential object of interest present the processor comprises:
    means for segmenting said image frame into at least one region of interest;
    means for applying at least one filter to each of said regions of interest which differentiates between various types of objects of interest so as to classify each of said regions of interest by type; and
    means for storing in said database as a unique record in said database at least a portion of a bitmap corresponding to each region of interest in said image frame, said record including information identifying the type object of interest classified from said at least one filter.

27. The system of claim 22 wherein for each image frame identified as having a potential object of interest present the processor comprises:
    means for segmenting said image frame into a plurality of non-overlapping image segments;
    means for identifying a segment that exhibits a differentiable characteristic as a search space; and
    means for expanding said search space to include segments adjacent to said segment that exhibits the differentiable characteristic.

28. The system of claim 27 wherein means for expanding further comprises:
    means for utilizing morphology techniques to grow and erode said search space by adding or subtracting segments adjacent said search space until either said search space meets or fails to meet uniform criteria for a differentiable characteristic.

29. The system of claim 22 wherein for at least two image frames that each depict at least a common potential object of interest the processor further comprises:
    a fuzzy logic color filter that is applied to said at least two image frames to segment as separate image portions from said at least two image frames each region that contains a group of pixels all having a color-set from a set of at least one pre-selected color-sets; and
    means for saving to as separate record in said database each of said separate image portions.

30. The system of claim 29 wherein the processor further comprises mean for converting said at least two image frames from a native color space to a single color space portion of a L*u*v color space and wherein the fuzzy logic color filter provides a value output signal that is at a maximum for only said set of at least one pre-selected color-sets.

31. The system of claim 30, wherein the value output signals of the fuzzy logic color filter for each pixel are determined by location in said L*u*v color space and wherein the value output signals are assigned to a minimal set of mathematically described colors representing all of the legal color names and combinations of said set of at least one pre-selected color sets.

32. The system of claim 29 wherein the fuzzy logic color filter segments the separate image portions such that each image portion contains a range of colors related to said color set whereby variations between colors of individual pixels are allowed to exist in said group of pixels that comprise each image portion.

33. The system of claim 22 wherein said location data metric stored in said database comprises at least an orientation of a camera while recording said image frame, a focal length of the camera and the location of the camera.

34. The system of claim 22 wherein the processor determines said location data metric for said road sign image by using triangulation techniques that assume a known location of at least one camera and a set of known camera parameters.

35. The system of claim 22 wherein said vehicle includes multiple cameras to generate said series of digital images.

36. The system of claim 22 wherein the processor stores into said database information selected from the set consisting of: a pointer to a portion of said frame in said frame buffer; a flag that an object of interest is present, a description of a portion of said frame; a portion of said frame, said frame, multiple frames of a common road sign image, or any combination thereof.

37. The system of claim 22 wherein the processor analyzes at least two frames of said series of digital images to determine whether the same object of interest is present in each of said at least two frames.

38. The system of claim 37 wherein the processor iteratively compares bitmap frames of said at least two frames of said series of digital images to determine if a first bitmap pixel set matches a second bitmap pixel set in terms of reflectance, color, shape or any combination thereof for an object of interest.

39. The system of claim 22 wherein the processor synchronizes a location data metric for each object of interest based on at least two frames of said series of digital images determined to have the same object of interest present.

40. The system of claim 22 wherein said filter system discards a large percentage of said images frames.

41. The method of claim 40 wherein at least ninety percent (90%) of said image frames are discarded by said filter system.

42. The system of claim 22 wherein said image frames potentially containing potential objects of interest are recorded and filtered such that approximately between five and forty percent (5–40%) of an available two dimensional image frame space contains an object of interest.

43. The system of claim 22 wherein said objects of interest are comprised of man-made materials having outlines at least a portion of which are generally linear in a scene generally populated by natural materials.

44. In a computer system, a computer-readable storage media storing:
    at least one computer program that operates to automatically generating a database of images and positions of object of interest from video images depicting roadside scenes that are recorded from a vehicle navigating a road and having a system that stores location information at least one camera recording those video images comprising the steps of:
        filtering said video images to identify image frames having potential objects of interest and discarding all other image frames;
        analyzing said image frames having potential objects of interest to identify an object of interest common to and contained in at least two different image frames;
        storing in a database at least a pointer to a portion of one image frame of said video images corresponding to each object of interest;
        determining a location data metric for each object of interest based on a location data metric of said vehicle when each of said at least two different image frames corresponding to said object of interest was originally recorded and an analysis of a position of said object of interest in said at least two different image frames; and storing in said database said location data metric determined for each object of interest.

45. The storage media of claim 44 wherein the step of filtering includes:

applying at least two separate filters to said image frame to generate a discrete output value from each filter, wherein each of at least two of said filters screens for a differentiable characteristic associated with a n object of interest that is unique to that filter;

comparing the discrete output values for each of said at least two filters to at least one reference; and identifying said image frame as potentially having an object of interest if at least one of the discrete output values indicates a differentiable characteristic is present for said image frame when the discrete output values are compared to the at least one reference.

46. The storage media of claim 44 wherein the at least one computer program further comprising the steps of:

for each image frame identified as having a potential object of interest present:

segmenting said image frame into at least one region of interest;

applying at least one filter to each of said regions of interest which differentiates between various types of objects of interest so as to classify each of said regions of interest by type; and storing in said database as a unique record in said database at least a portion of a bitmap corresponding to each region of interest in said image frame, said record including information identifying the type of object of interest classified from said at least one filter.

47. The storage media of claim 44 wherein the at least one computer program further comprising the steps of:

for each image frame identified as having a potential object of interest:

segmenting said image frame into a plurality of non-overlapping image segments;

identifying a segment that exhibits a differentiable characteristic as a search space; and expanding said search space to include segments adjacent to said segment that exhibits the differentiable characteristic utilizing morphology techniques to grow and erode said search space by adding or subtracting segments adjacent said search space until either said search space meets or fails to meet uniform criteria for a differentiable characteristic.

48. The storage media of claim 44 wherein the at least one computer program further comprising the steps of:

applying a fuzzy logic color filter to said at least two different image frames to segment as separate image portions from said at least two different image frames each region that contains a group of pixels all having a color-set from a set of at least one pre-selected color-sets; and saving as a separate record in said database each of said separate image portions.

49. The storage media of claim 44 wherein said location data metric stored in said database comprises storing at least an orientation of a camera while recording said image frame, a focal length of the camera and the location of the camera.

50. The storage media of claim 44 wherein the step of storing said location data metric determines said location data metric for said road sign image by using triangulation techniques that assume a known location of at least one camera and a set of known camera parameters.

51. The storage media of claim 44 wherein the step of storing in said database said at least a pointer to a portion of said image frame includes the steps selected from the set consisting of: storing a pointer to a portion of said image frame in said frame buffer; setting a flag that a road sign image is present, storing a description of a portion of said image frame; storing a portion of said image frame, storing said image frame, storing multiple image frames of a common road sign image, or any combination thereof.

52. The storage media of claim 44 wherein said step of filtering discards a large percentage of said images frames.

53. The storage media of claim 52 wherein at least ninety percent (90%) of said image frames are discarded by said step of filtering.

54. The storage media of claim 44 wherein said image frames potentially containing potential objects of interest are recorded and filtered such that approximately between five and forty percent (5–40%) of an available two dimensional image frame space contains an object of interest.

55. The storage media of claim 44 wherein said objects of interest are comprised of man-made materials having outlines at least a portion of which are generally linear in a scene generally populated by natural materials.

56. A method for generating a database of images and positions of objects of interest comprising the steps of:

recording video images depicting roadside scenes that are recorded from a vehicle while navigating a road;

determining a location data metric of said vehicle corresponding to a location of said vehicle along a road when at each of least a portion of the image frames of said video images are recorded;

using a computer processor system to analyze said video images to identify a plurality of objects of interest that discards image frames if no object of interest is initially detected and analyzes the remaining image frame and stores in a database:

at least a pointer to a portion of an image frame of said video images corresponding to each of said plurality of objects of interest; and a location data metric corresponding to a location of said vehicle for each of said plurality of objects of interest when said image frame corresponding to that object of interest was originally recorded.

57. The method of claim 56 wherein the computer processor system analyzes each image frame by:

applying at least two separate filters to said image frame to generate a discrete output value from each filter, wherein each of at least two of said filters screens for a differentiable characteristic associated with an object of interest that is unique to that filter;

comparing the discrete output values for each of said at least two filters to at least one reference; and identifying said image frame as potentially having a road sign image if at least one of the discrete output values indicates a differentiable characteristic is present for said image frame when the discrete output values are compared to the at least one reference.

58. The method of claim 57 wherein each of said at least two filters is selected from the set of the following filters: an edge filter, a color-pair filter, a color filter operating in the L*u*v color space, an edge filter combined with a line extender, or a color filter operating in the LCH color space.

59. The method of claim 57 wherein the differentiable characteristics of each of said at least two filters is selected from the set comprising: color characteristics, edge characteristics, texture characteristics, symmetry, convexity, lack of three dimensional volume, number and orientation of side edges, characteristic corner angles, frequency and luminescence.

60. The method of claim 56 wherein the computer processor system analyzes each image frame by:

determining whether said image frame has at least one region of interest and, if so, segmenting said image frame into at least one region of interest;

applying at least one filter to each of said regions of interest which differentiates between various types of objects of interest so as to classify each of said regions of interest by type; and storing in said database as a unique record in said database at least a portion of a bitmap corresponding to each region of interest in said image frame, said record including information identifying the type of object of interest classified from said at least one filter.

61. The method of claim 56 wherein the computer processor system analyzes each image frame by:

discarding image frames that do not have at least one region of interest;

segmenting said remaining image frames into a plurality of non-overlapping image segments;

identifying a segment that exhibits a differentiable characteristic as a search space; and expanding said search space to include segments adjacent to said segment that exhibits the differentiable characteristic by adding or subtracting segments adjacent said search space until either said search space meets or fails to meet uniform criteria for a differentiable characteristic.

62. The method of claim 56 the computer processor analyzes at least two image frames that each depict at least a single common road sign by:

applying a fuzzy logic color filter to said at least two image frames to segment as separate image portions from said at least two image frames each region that contains a group of pixels all having a color-set from a set of at least one pre-selected color-sets; and saving as a separate record in said database each of said separate image portions.

63. The method of claim 62 wherein prior to applying the fuzzy logic color filter, the computer processor converts said at least two image frames from a native color space to a single color space portion of a L*u*v color space and wherein the fuzzy logic color filter provides a value output signal that is at a maximum for only said set of at least one pre-selected color-sets.

64. The method of claim 62, wherein the value output signals of the fuzzy logic color filter for each pixel are determined by location in said L*u*v color space and wherein the value output signals are assigned to a minimal set of mathematically described colors representing all of the legal color names and combinations of said set of at least one pre-selected color sets.

65. The method of claim 62 wherein the fuzzy logic color filter segments the separate image portions such that each image portion contains a range of colors related to said color set whereby variations between colors of individual pixels are allowed to exist in said group of pixels that comprise each image portion.

66. The method of claim 56 wherein the location data metric stored in said database comprises at least an orientation of a camera while recording said image frame, a focal length of the camera and the location of the camera.

67. The method of claim 56 wherein the step of storing said location data metric determines a location data metric for said road sign image by using triangulation techniques that assume a known location of at least one camera and a set of known camera parameters.

68. The method of claim 56 wherein the step of storing in said database said at least a pointer to a portion of said image frame includes the steps selected from the set consisting of: storing a pointer to a portion of said image frame in said frame buffer; setting a flag that an object of interest is present, storing a description of a portion of said image frame; storing a portion of said image frame, storing said image frame, storing multiple image frames of a common object of interest, or any combination thereof.

69. The method of claim 56 wherein the step of analyzing said video images further comprises the steps of:

iteratively comparing at least two frames of said video images having a potential object of interest present to correlate images of objects of interest in common in each of said at least two frames; and if there is a correlation, storing in said database at least an indication for at least one of the video images having an object of interest present that a common image is depicted in multiple frames.

70. The method of claim 69 wherein the step of iteratively comparing includes the step of iteratively comparing bitmap frames of said at least two frames of said video image to determine if a first bitmap pixel set matches a second bitmap pixel set in terms of reflectance, color, shape or any combination thereof for the object of interest.

71. The method of claim 70 wherein the step of storing includes the steps of:

placing all members of the first pixel set and the second pixel set that match in an identified field of said database;

synchronizing a location data metric to the identified field; and storing in said database at least a pointer to a representative bitmap image of either the first pixel set or the second pixel set in conjunction with said location data metric.

72. The method of claim 71 wherein the said location data metric is determined for said common images of said object of interest by using triangulation techniques that assume a known location of at least one camera and a set of known camera parameters.

73. The method of claim 56 wherein said step of filtering discards a large percentage of said images frames.

74. The method of claim 73 wherein at least ninety percent (90%) of said image frames are discarded by said step of filtering.

75. The method of claim 56 wherein said image frames potentially containing potential objects of interest are recorded and filtered such that approximately between five and forty percent (5–40%) of an available two dimensional image frame space contains an object of interest.

76. The method of claim 56 wherein said objects of interest are comprised of man-made materials having outlines at least a portion of which are generally linear in a scene generally populated by natural materials.

* * * * *